United States Patent
Sugimoto

(10) Patent No.: US 9,964,196 B2
(45) Date of Patent: May 8, 2018

(54) BICYCLE SPROCKET

(71) Applicant: SHIMANO INC., Sakai (JP)

(72) Inventor: Akinobu Sugimoto, Sakai (JP)

(73) Assignee: SHIMANO INC., Sakai (JP)

( * ) Notice: Subject to any disclaimer, the term of this patent is extended or adjusted under 35 U.S.C. 154(b) by 91 days.

(21) Appl. No.: 14/283,165

(22) Filed: May 20, 2014

(65) Prior Publication Data

US 2015/0337943 A1 Nov. 26, 2015

(51) Int. Cl.
| | | |
|---|---|---|
| *F16H 55/17* | (2006.01) |
| *B62M 9/02* | (2006.01) |
| *F16H 55/08* | (2006.01) |
| *B62M 9/00* | (2006.01) |

(52) U.S. Cl.
CPC ............. *F16H 55/171* (2013.01); *B62M 9/00* (2013.01); *B62M 9/02* (2013.01); *F16H 55/08* (2013.01)

(58) Field of Classification Search
CPC ........ F16H 55/08; F16H 55/17; F16H 55/171; F16H 55/30; F16H 55/303; B62M 1/36; B62M 9/105
See application file for complete search history.

(56) References Cited

U.S. PATENT DOCUMENTS

| | | | | |
|---|---|---|---|---|
| 586,991 A | * | 7/1897 | Curley | ............. F16H 55/30 474/156 |
| 588,950 A | * | 8/1897 | Brown | ............. F16H 55/303 474/155 |
| 590,649 A | * | 9/1897 | Ribyn, Jr. | ............. F16H 55/30 474/156 |
| 591,270 A | | 10/1897 | Gauthier | |
| 592,552 A | * | 10/1897 | Morse | ............. F16H 55/30 474/156 |
| 593,714 A | | 11/1897 | Baldwin | |
| 619,537 A | | 2/1899 | Bufford | |
| D35,193 S | * | 10/1901 | Dodge | ............. 474/152 |

(Continued)

FOREIGN PATENT DOCUMENTS

| | | |
|---|---|---|
| CH | 411478 | 4/1966 |
| CN | 103419893 | 12/2013 |

(Continued)

OTHER PUBLICATIONS

Cancellation Writ for corresponding DE Application No. DE 20 2015 008 960.7, Jul. 24, 2017.

*Primary Examiner* — Minh Truong
(74) *Attorney, Agent, or Firm* — Mori & Ward, LLP

(57) ABSTRACT

A bicycle sprocket comprises sprocket teeth. The sprocket teeth include at least one first tooth and at least one second tooth. The at least one first tooth has a first radial-tooth height. The at least one first tooth has a first chain-engaging axial width which is smaller than a first distance defined between opposed outer link plates of a bicycle chain and which is larger than a second distance defined between opposed inner link plates of the bicycle chain. The at least one second tooth is adjacent to the first tooth and is disposed on a downstream side in a rotational driving direction of the bicycle sprocket. The at least one second tooth is configured to engage with inner link plates of the bicycle chain. The at least one second tooth has a second radial-tooth height. The first radial-tooth height is greater than the second radial-tooth height.

19 Claims, 25 Drawing Sheets

(56) References Cited

U.S. PATENT DOCUMENTS

| | | | |
|---|---|---|---|
| 740,445 A | 10/1903 | Langerfeld | |
| 4,174,642 A | 11/1979 | Martin et al. | |
| 5,192,249 A * | 3/1993 | Nagano | B62M 9/10 |
| | | | 474/160 |
| 5,503,598 A | 4/1996 | Neuer et al. | |
| 5,545,096 A | 8/1996 | Su | |
| 8,888,631 B2 * | 11/2014 | Morita | F16H 7/06 |
| | | | 474/153 |
| 2002/0098934 A1 | 7/2002 | Wigston | |
| 2004/0259674 A1 * | 12/2004 | Pfister | F16H 55/30 |
| | | | 474/152 |
| 2007/0049437 A1 * | 3/2007 | Wickliffe | F16H 55/30 |
| | | | 474/152 |
| 2007/0054768 A1 | 3/2007 | Miyazawa | |
| 2008/0132367 A1 | 6/2008 | Braedt | |
| 2008/0259063 A1 | 10/2008 | Kim et al. | |
| 2010/0227720 A1 * | 9/2010 | Mehta | F16H 55/30 |
| | | | 474/155 |
| 2013/0109519 A1 | 5/2013 | Morita | |
| 2013/0139642 A1 * | 6/2013 | Reiter | B62M 9/105 |
| | | | 74/594.2 |
| 2013/0143704 A1 | 6/2013 | Blank et al. | |
| 2014/0162821 A1 * | 6/2014 | Braedt | F16H 55/30 |
| | | | 474/155 |
| 2015/0285364 A1 * | 10/2015 | Pfeiffer | B62M 9/10 |
| | | | 474/152 |
| 2015/0337943 A1 | 11/2015 | Sugimoto | |

FOREIGN PATENT DOCUMENTS

| | | |
|---|---|---|
| DE | 10130254 B4 | 1/2003 |
| DE | 10 2006 039 333 | 3/2007 |
| DE | 10 2015 006 582 | 11/2015 |
| DE | 20 2015 008 960 U1 | 4/2016 |
| EP | 0386685 B1 | 9/1990 |
| EP | 0642972 B1 | 3/1995 |
| EP | 0934871 | 8/1999 |
| EP | 1167174 B1 | 2/2002 |
| EP | 1609713 | 12/2005 |
| EP | 1700781 | 9/2006 |
| EP | 1927790 B1 | 6/2008 |
| GB | 551756 | 3/1943 |
| JP | 5642489 U | 4/1981 |
| JP | 01-171795 U | 12/1989 |
| JP | 2000-355295 | 12/2000 |
| JP | 5410670 B2 | 11/2008 |
| WO | WO 03/095867 | 11/2003 |

* cited by examiner

BICYCLE SPROCKET

BACKGROUND OF THE INVENTION

Field of the Invention

The present invention relates to a bicycle sprocket.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been recently redesigned is a bicycle sprocket.

Most bicycles have a drive train that uses the bicycle sprocket to transmit the pedaling action from the rider to a bicycle wheel through a bicycle chain. A front sprocket and a rear sprocket have been known as the bicycle sprocket. The bicycle sprocket generally includes a plurality of teeth to engage with the bicycle chain.

SUMMARY OF THE INVENTION

In accordance with a first aspect of the present invention, a bicycle sprocket comprises sprocket teeth. The sprocket teeth include at least one first tooth and at least one second tooth. The at least one first tooth is configured to engage with outer link plates of a bicycle chain and has a first radial-tooth height. The at least one first tooth has a first chain-engaging axial width which is smaller than a first distance defined between opposed outer link plates of the bicycle chain and which is larger than a second distance defined between opposed inner link plates of the bicycle chain. The at least one second tooth is adjacent to the first tooth and is disposed on a downstream side in a rotational driving direction of the bicycle sprocket. The at least one second tooth is configured to engage with inner link plates of the bicycle chain. The at least one second tooth has a second radial-tooth height. The first radial-tooth height is greater than the second radial-tooth height.

In accordance with a second aspect of the present invention, the bicycle sprocket according to the first aspect is configured so that the sprocket teeth includes a plurality of first teeth as the at least one first tooth, and a plurality of second teeth as the at least one second tooth.

In accordance with a third aspect of the present invention, the bicycle sprocket according to the first aspect is configured so that the at least one first tooth and the at least one second tooth are alternately arranged in a circumferential direction of the bicycle sprocket.

In accordance with a fourth aspect of the present invention, the bicycle sprocket according to the third aspect further comprises a sprocket body having an annular shape. The at least one first tooth and the at least one second tooth are alternately arranged on a whole circumference of the sprocket body in the circumferential direction.

In accordance with a fifth aspect of the present invention, the bicycle sprocket according to the first aspect is configured so that the at least one first tooth is configured to engage with the bicycle chain before the second tooth engages with the bicycle chain.

In accordance with a sixth aspect of the present invention, the bicycle sprocket according to the first aspect is configured so that the at least one second tooth has a second chain-engaging axial width which is smaller than the second distance.

In accordance with a seventh aspect of the present invention, the bicycle sprocket according to the first aspect is configured so that the at least one first tooth includes a chamfered part configured to reduce interference between the at least one first tooth and one of inner ink plates of the bicycle chain.

In accordance with an eighth aspect of the present invention, the bicycle sprocket according to the first aspect is configured so that the at least one first tooth includes a first radial contact part configured to contact at least one of intermediate portions of outer link plates of the bicycle chain in a radial direction of the bicycle sprocket in a state where the at least one first tooth engages with the outer link plates of the bicycle chain.

In accordance with a ninth aspect of the present invention, the bicycle sprocket according to the eighth aspect is configured so that the first radial contact part has a first axial width larger than a first distance defined between opposed outer link plates of the bicycle chain.

In accordance with a tenth aspect of the present invention, the bicycle sprocket according to the first aspect is configured so that the at least one second tooth includes a second radial contact part configured to contact at least one of intermediate portions of inner link plates of the bicycle chain in a radial direction of the bicycle sprocket in a state where the at least one second tooth engages with the inner link plates of the bicycle chain.

In accordance with an eleventh aspect of the present invention, the bicycle sprocket according to the tenth aspect is configured so that the second radial contact part has a second axial width larger than a second distance defined between opposed inner link plates of the bicycle chain.

In accordance with a twelfth aspect of the present invention, the bicycle sprocket according to the first aspect further comprises at least one additional tooth having a chain-engaging axial width smaller than a second distance defined between opposed inner link plates of the bicycle chain. Each of the at least one additional tooth is disposed adjacent to the at least one first tooth such that the bicycle chain is shifted between the bicycle sprocket and an additional bicycle sprocket in an area in which the at least one additional tooth is positioned.

In accordance with a thirteenth aspect of the present invention, the bicycle sprocket according to the first aspect further comprises a spike pin configured to guide the bicycle chain toward the sprocket teeth during shifting operation.

In accordance with a fourteenth aspect of the present invention, the bicycle sprocket according to the first aspect is configured so that each of the sprocket teeth has a multi-layered structure with different materials.

In accordance with a fifteenth aspect of the present invention, the bicycle sprocket according to the fourteenth aspect is configured so that each of the sprocket teeth includes a first sprocket layer, a second sprocket layer, and a third sprocket layer. The first sprocket layer is made of a first-layer material comprising iron. The second sprocket layer is made of a second-layer material comprising aluminum. The third sprocket layer is made of a third-layer material comprising iron. The second sprocket layer is provided between the first sprocket layer and the third sprocket layer.

In accordance with a sixteenth aspect of the present invention, the bicycle sprocket according to the fourteenth aspect is configured so that each of the sprocket teeth includes a first sprocket layer, a second sprocket layer, and a third sprocket layer. The first sprocket layer is made of a first-layer material comprising iron. The second sprocket layer is made of a second-layer material comprising a resin material. The third sprocket layer is made of a third-layer material comprising iron. The second sprocket layer is provided between the first sprocket layer and the third sprocket layer.

In accordance with a seventeenth aspect of the present invention, the bicycle sprocket according to the first aspect is configured so that each of the sprocket teeth includes a tooth bottom defining a root circle of the bicycle sprocket. At least one of the sprocket teeth includes a closed opening at least partially provided radially outward of the root circle.

In accordance with an eighteenth aspect of the present invention, the bicycle sprocket according to the first aspect is configured so that at least one of the sprocket teeth includes a cutout configured to increase flexibility of the at least one of the sprocket teeth.

In accordance with a nineteenth aspect of the present invention, the bicycle sprocket according to the first aspect further comprises a sprocket body having an annular shape. The sprocket teeth are separate members from each other and spaced apart from each other in a circumferential direction of the bicycle sprocket. Each of the sprocket teeth includes a base part and a tooth part. The base part is implanted in the sprocket body. The tooth part radially outwardly protrudes from the base part.

In accordance with a twentieth aspect of the present invention, the bicycle sprocket according to the nineteenth aspect is configured so that each of the sprocket teeth is made of a first material comprising a metallic material. The sprocket body is made of a second material comprising a resin material.

In accordance with a twenty-first aspect of the present invention, the bicycle sprocket according to the first aspect further comprises a sprocket body having an annular shape. Each of the sprocket teeth is made of a first material comprising a metallic material. The sprocket body is made of a second material comprising a resin material.

In accordance with a twenty-second aspect of the present invention, the bicycle sprocket according to the first aspect is configured so that the sprocket teeth are equally spaced apart from each other in a circumferential direction of the bicycle sprocket. Each of the sprocket teeth has a center line radially extending from a rotational axis of the bicycle sprocket. Each of the sprocket teeth has a symmetrical shape with respect to the center line.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
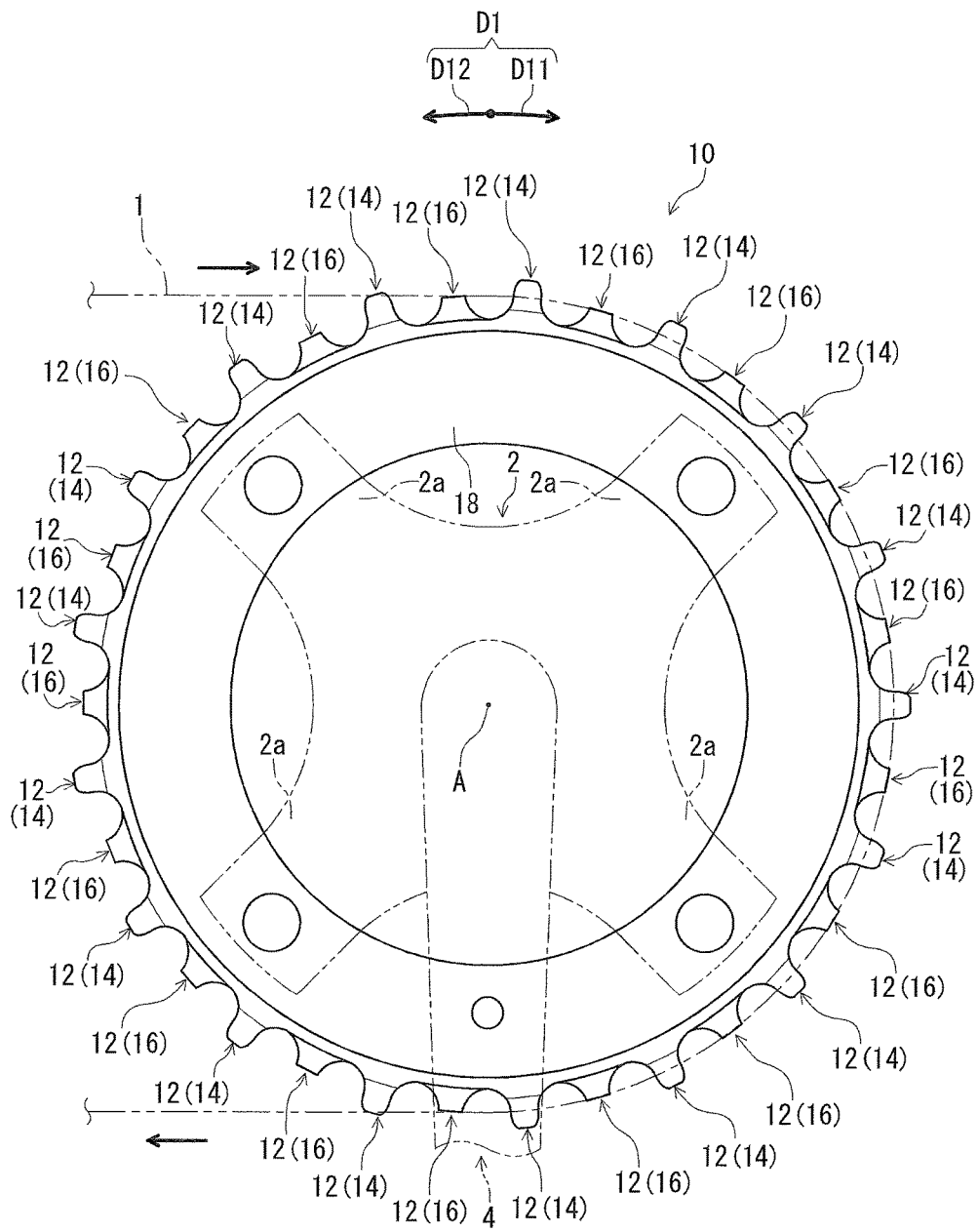
FIG. 1 is an elevational view of a bicycle sprocket in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle sprocket 10 in accordance with a first embodiment is configured to engage with a bicycle chain 1. The bicycle sprocket 10 is rotatable about a rotational center axis A. In the illustrated embodiment, the bicycle sprocket 10 is a front sprocket configured to be provided on a gear crank (right crank) of a bicycle. Structures of the bicycle sprocket 10 can, however, be applied to a rear sprocket.

The bicycle sprocket 10 is configured to be fastened to crank connecting arms 2a of a sprocket mounting member 2 by bolts (not shown). The sprocket mounting member 2 is fastened on a crank arm 4 to be rotatable integrally with the crank arm 4 about the rotational center axis A. The sprocket mounting member 2 can also be integrally provided with the crank arm 4 as a single unitary member. Namely, the bicycle sprocket 10 is configured to be rotatable integrally with the sprocket mounting member 2 and the crank arm 4 about the rotational center axis A. The bicycle sprocket 10 is configured to be rotated about the rotational center axis A in a rotational driving direction D11 during the pedaling. The rotational driving direction D11 is defined along a circumferential direction D1 of the bicycle sprocket 10. A direction D12 is defined along the circumferential direction D1. The direction D12 is opposite to the rotational driving direction D11.

As seen in FIG. 1, the bicycle sprocket 10 comprises sprocket teeth 12. The sprocket teeth 12 include at least one first tooth 14 and at least one second tooth 16. In the illustrated embodiment, the sprocket teeth 12 include a plurality of first teeth 14 as the at least one first tooth 14 and a plurality of second teeth 16 as the at least one second tooth 16. The at least one first tooth 14 and the at least one second tooth 16 are alternately arranged in the circumferential direction D1 of the bicycle sprocket 10. In the illustrated embodiment, the first teeth 14 and the second teeth 16 are alternately arranged in the circumferential direction D1. The sprocket teeth 12 can include at least one first tooth 14 (e.g., one first tooth 14) and at least one second tooth 16 (e.g., one second tooth 16) if needed and/or desired. Furthermore, the sprocket teeth 12 can include teeth having a shape different from a shape of each of the first tooth 14 and the second tooth 16.

The bicycle sprocket 10 further comprises a sprocket body 18 having an annular shape. The sprocket teeth 12 radially outwardly protrude from the sprocket body 18. The at least one first tooth 14 and the at least one second tooth 16 are alternately arranged on a whole circumference of the sprocket body 18 in the circumferential direction D1. The sprocket body 18 is configured to be fastened to the crank connecting arms 2a of the sprocket mounting member 2 by bolts (not shown). In the illustrated embodiment, the sprocket teeth 12 and the sprocket body 18 comprise a metallic material such as aluminum, iron and titanium. The sprocket teeth 12 are integrally provided with the sprocket body 18 as a single unitary member. The sprocket teeth 12 can, however, be separately provided from the sprocket body 18.

Figure 2:
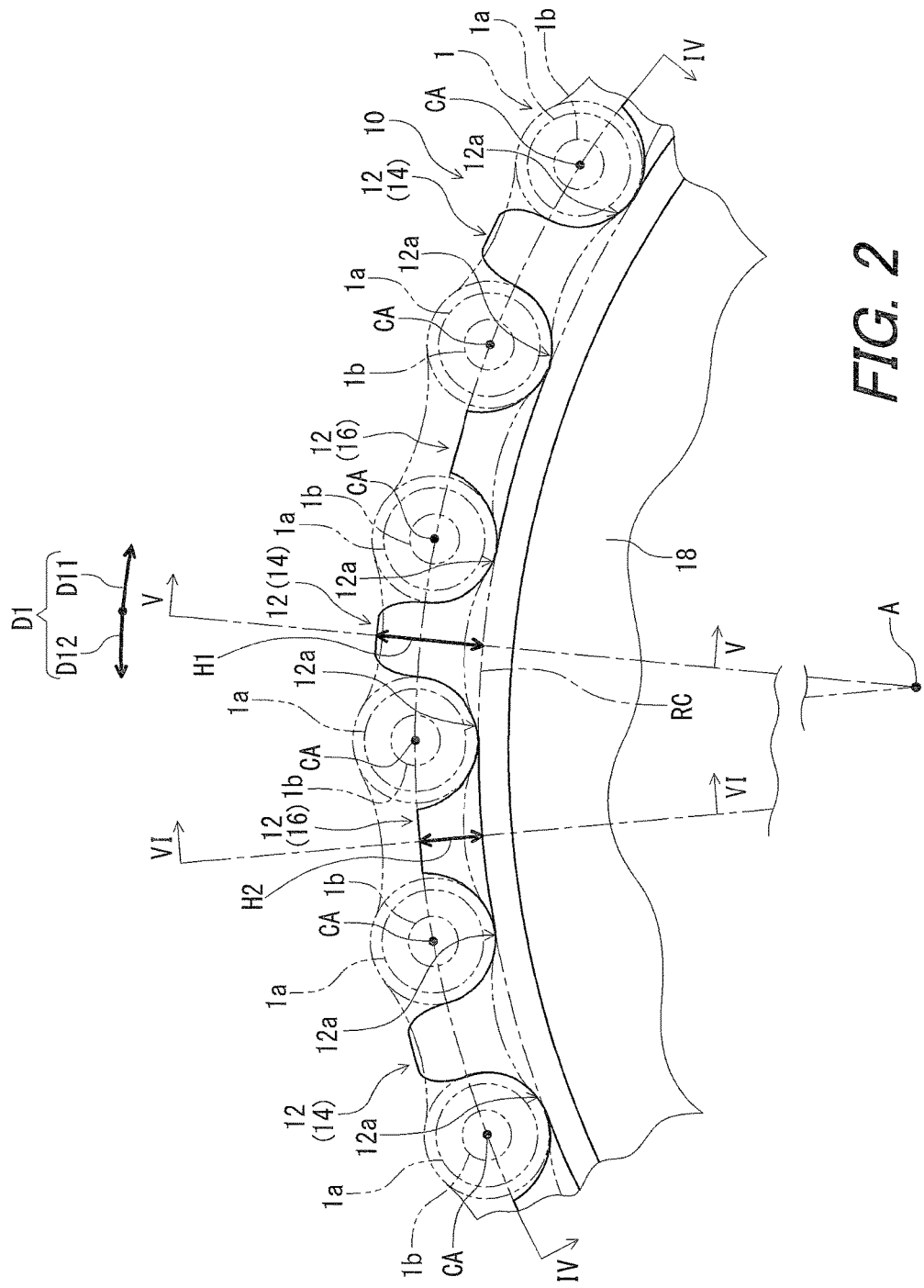
FIG. 2 is an enlarged elevational view of the bicycle sprocket illustrated in FIG. 1.

As seen in FIG. 2, the at least one second tooth 16 is adjacent to the first tooth 14 and is disposed on a downstream side in the rotational driving direction D11 of the bicycle sprocket 10. The sprocket teeth 12 include tooth bottoms 12a defining a root circle RC of the bicycle sprocket 10.

Figure 3:
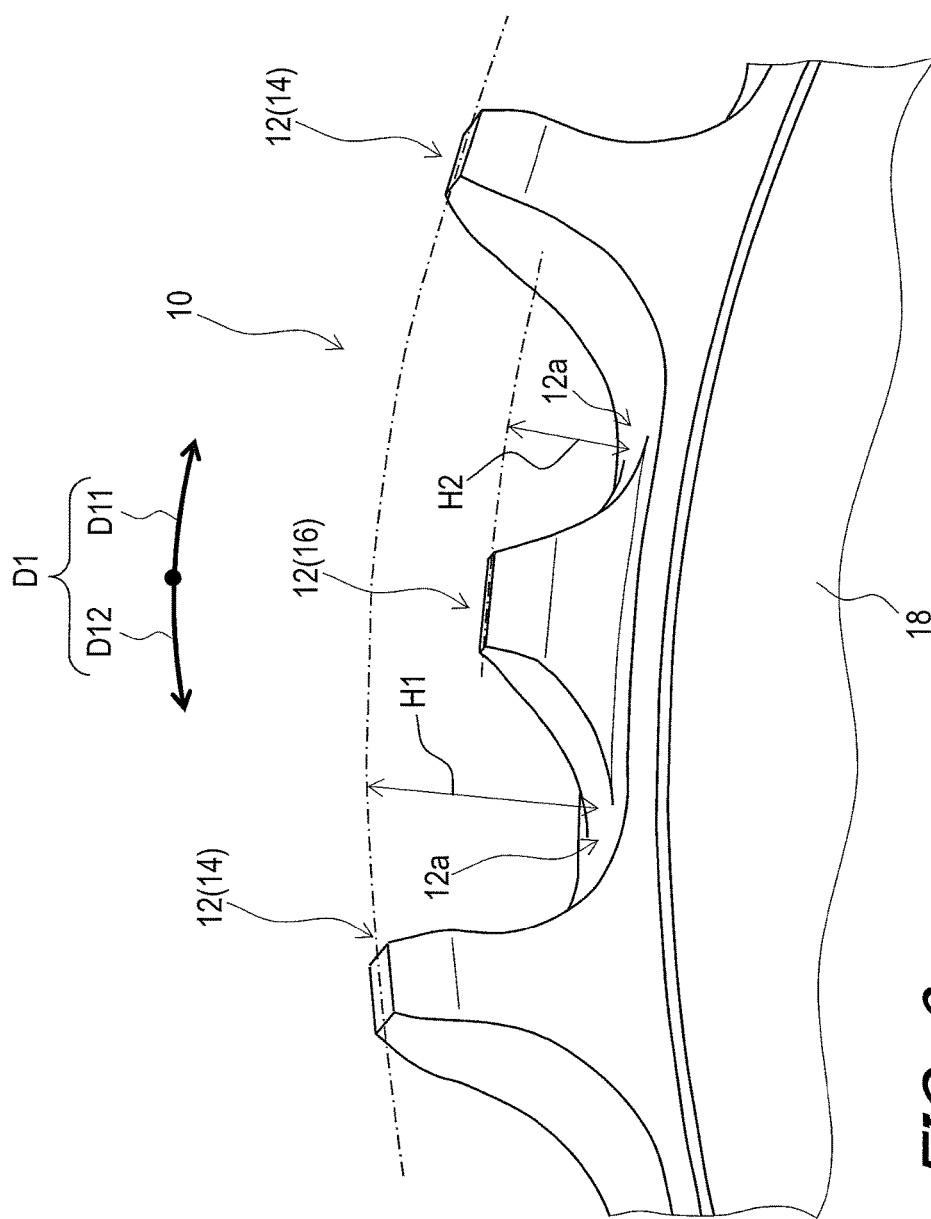
FIG. 3 is a partial perspective view of the bicycle sprocket illustrated in FIG. 1.

As seen in FIGS. 2 and 3, the at least one first tooth 14 has a first radial-tooth height H1. The at least one second tooth 16 has a second radial-tooth height H2. The first radial-tooth height H1 is greater than the second radial-tooth height H2. In the illustrated embodiment, the first radial-tooth height H1 is defined between the root circle RC and a radially outer end of the first tooth 14. The second radial-tooth height H2 is defined between the root circle RC and a radially outer end of the second tooth 16.

Figure 4:
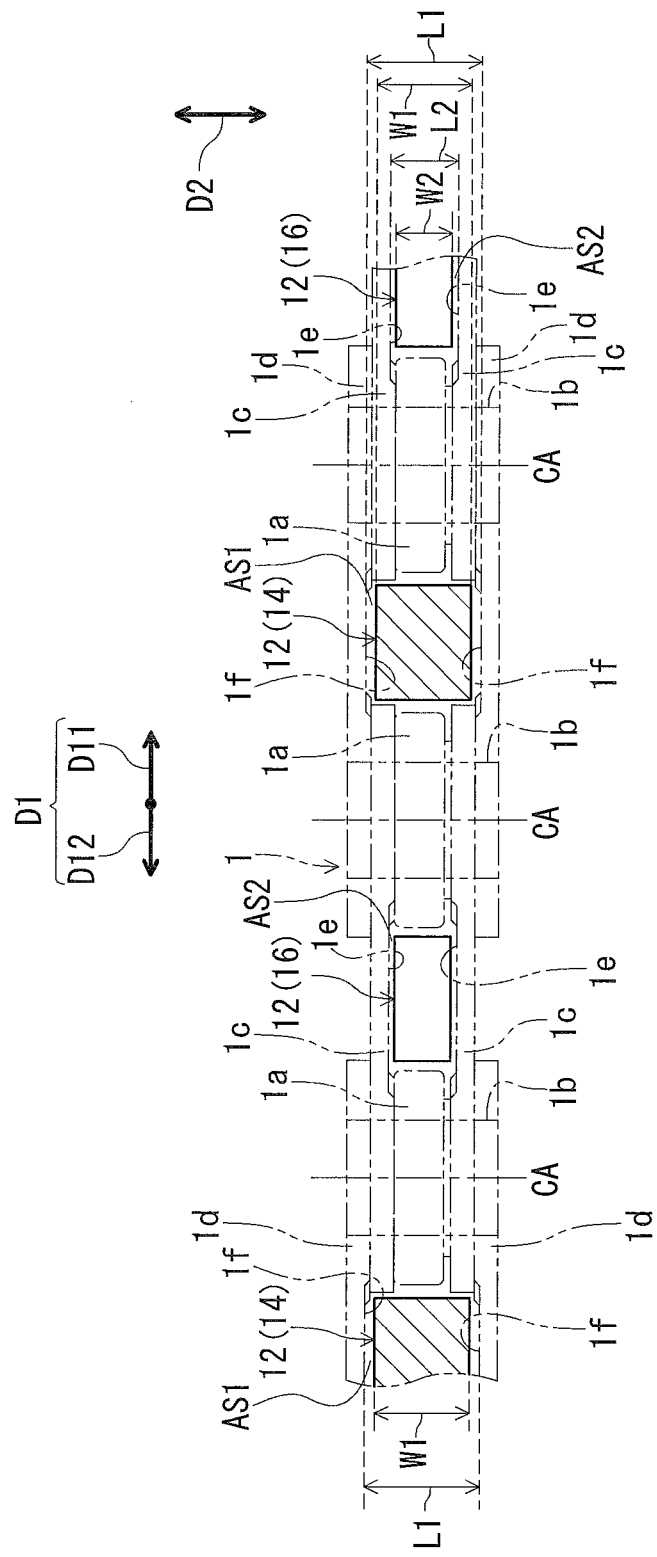
FIG. 4 is a cross-sectional view of the bicycle sprocket taken along line IV-IV of FIG. 2.

As seen in FIG. 4, the at least one first tooth 14 is configured to engage with outer link plates 1d of the bicycle chain 1. The at least one first tooth 14 has a first chain-engaging axial width W1 which is smaller than a first distance L1 defined between opposed outer link plates 1d of the bicycle chain 1 and which is larger than a second distance L2 defined between opposed inner link plates 1c of the bicycle chain 1. The at least one second tooth 16 is configured to engage with inner link plates 1c of the bicycle chain 1. The at least one second tooth 16 has a second chain-engaging axial width W2 which is smaller than the second distance L2. Preferably, the first chain-engaging axial width W1 is defined so that the at least one first tooth 14 fitly engages with the outer link plate 1d, and the second chain-engaging axial width W2 is defined so that the at least one second tooth 16 fitly engages with the inner link plates 1c.

As seen in FIG. 4, the opposed outer link plates 1d includes opposed inner surfaces 1f defining an axial space AS1 in which the first tooth 14 is to be disposed. The opposed inner link plates 1c include opposed inner surfaces 1e defining an axial space AS2 in which the second tooth 16 is to be disposed. The first distance L1 is an axial distance between the opposed inner surfaces 1f of the opposed outer link plates 1d in a direction D2 parallel to center axes CA of pins 1b which rotatably support rollers 1a. The second distance L2 is an axial distance between the opposed inner surfaces 1e of the opposed inner link plates 1c in the direction D2 parallel to the center axes CA of the pins 1b.

Figure 5:
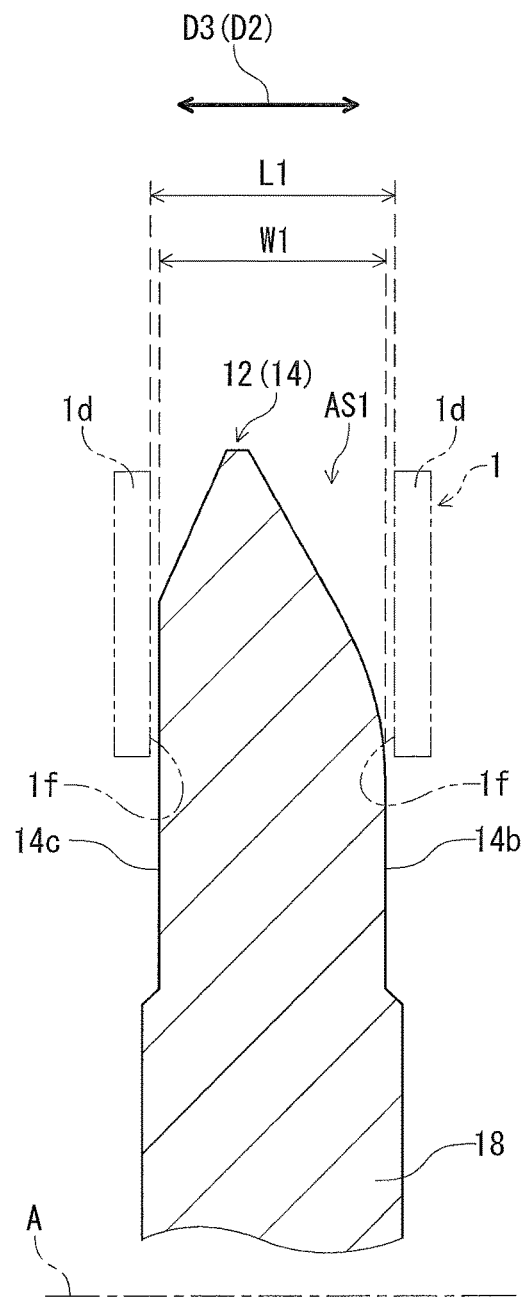
FIG. 5 is a cross-sectional view of the bicycle sprocket taken along line V-V of FIG. 2.

As seen in FIG. 5, the first tooth 14 has a first chain-engaging surface 14b and a second chain-engaging surface 14c. The first chain-engaging surface 14b and the second chain-engaging surface 14c face in an axial direction D3 parallel to the rotational axis A of the bicycle sprocket 10. The first chain-engaging surface 14b and the second chain-engaging surface 14c are contactable with the opposed inner surfaces 1f of the outer link plates 1d, respectively. For example, the first chain-engaging axial width W1 is a maximum axial width defined between the first chain-engaging surface 14b and the second chain-engaging surface 14c in the axial direction D3. In a state where the bicycle chain 1 engages with the bicycle sprocket 10, the axial direction D3 coincides with the direction D2 defined with respect to the bicycle chain 1.

Figure 6:
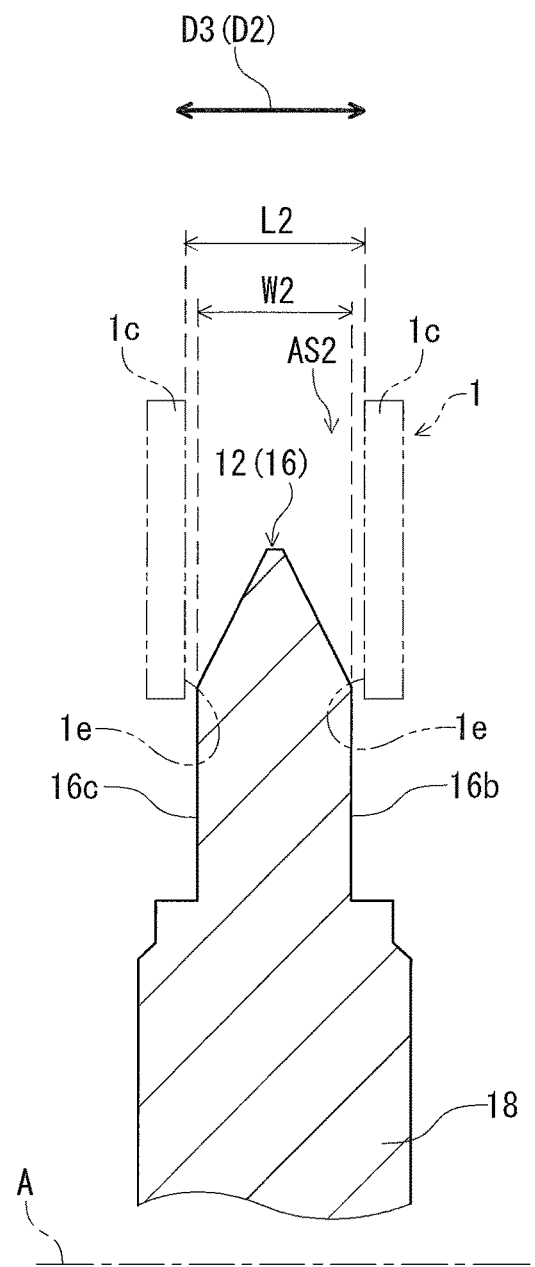
FIG. 6 is a cross-sectional view of the bicycle sprocket taken along line VI-VI of FIG. 2.
Figure 7:
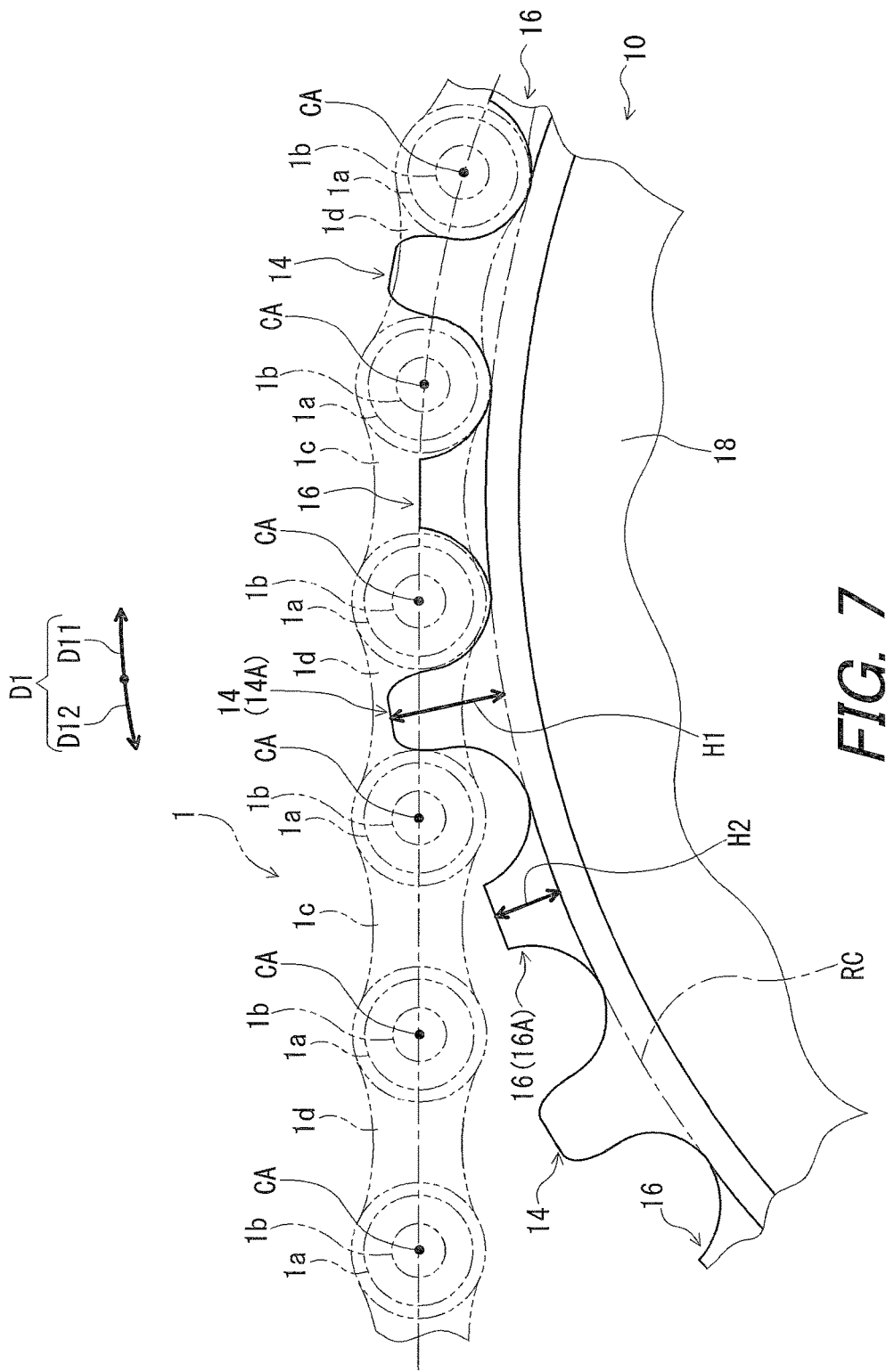
FIG. 7 is an enlarged elevational view of the bicycle sprocket illustrated in FIG. 1 for explaining positional relationship between the bicycle sprocket and a bicycle chain.

As seen in FIG. 6, the second tooth 16 has a third chain-engaging surface 16b and a fourth chain-engaging surface 16c. The third chain-engaging surface 16b and the fourth chain-engaging surface 16c face in the axial direction D3. The third chain-engaging surface 16b and the fourth chain-engaging surface 16c are contactable with the opposed inner surfaces 1e of the inner link plates 1c, respectively. For example, the second chain-engaging axial width W2 is a maximum axial width defined between the third chain-engaging surface 16b and the fourth chain-engaging surface 16c in the axial direction D3.

With the bicycle sprocket 10, as seen in FIG. 4, the at least one first tooth 14 has the first chain-engaging axial width W1 which is smaller than the first distance L1 defined between opposed outer link plates of the bicycle chain 1 and which is larger than the second distance L2 defined between opposed inner link plates of the bicycle chain 1. This improves holding function of the bicycle sprocket 10 for the bicycle chain 1.

Furthermore, since contact between the second tooth 16 and the bicycle chain 1 can reduce contact pressure between the first tooth 14 and the bicycle chain 1, it is possible to reduce wear of the first tooth 14 compared with a comparative bicycle sprocket including only the first tooth 14 without the second tooth 16. Accordingly, it is possible to maintaining the service life of the bicycle sprocket 10 with improving the holding function of the bicycle sprocket 10 for the bicycle chain 1.

Second Embodiment

A bicycle sprocket 210 in accordance with a second embodiment will be described below referring to FIGS. 8 and 9. The bicycle sprocket 210 has the same configuration as the bicycle sprocket 10 except for the sprocket teeth 12. Thus, elements having substantially the same function as those in the first embodiment will be numbered the same here, and will not be described again in detail here for the sake of brevity.

Figure 8:
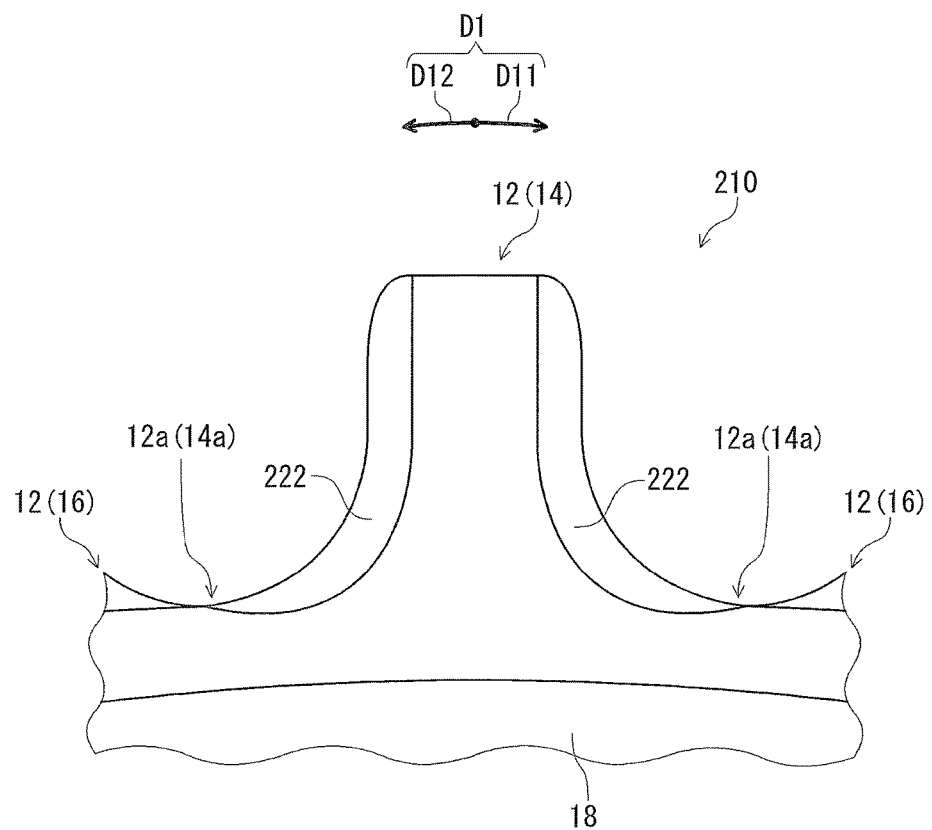
FIG. 8 is an enlarged elevational view of a bicycle sprocket in accordance with a second embodiment.
Figure 9:
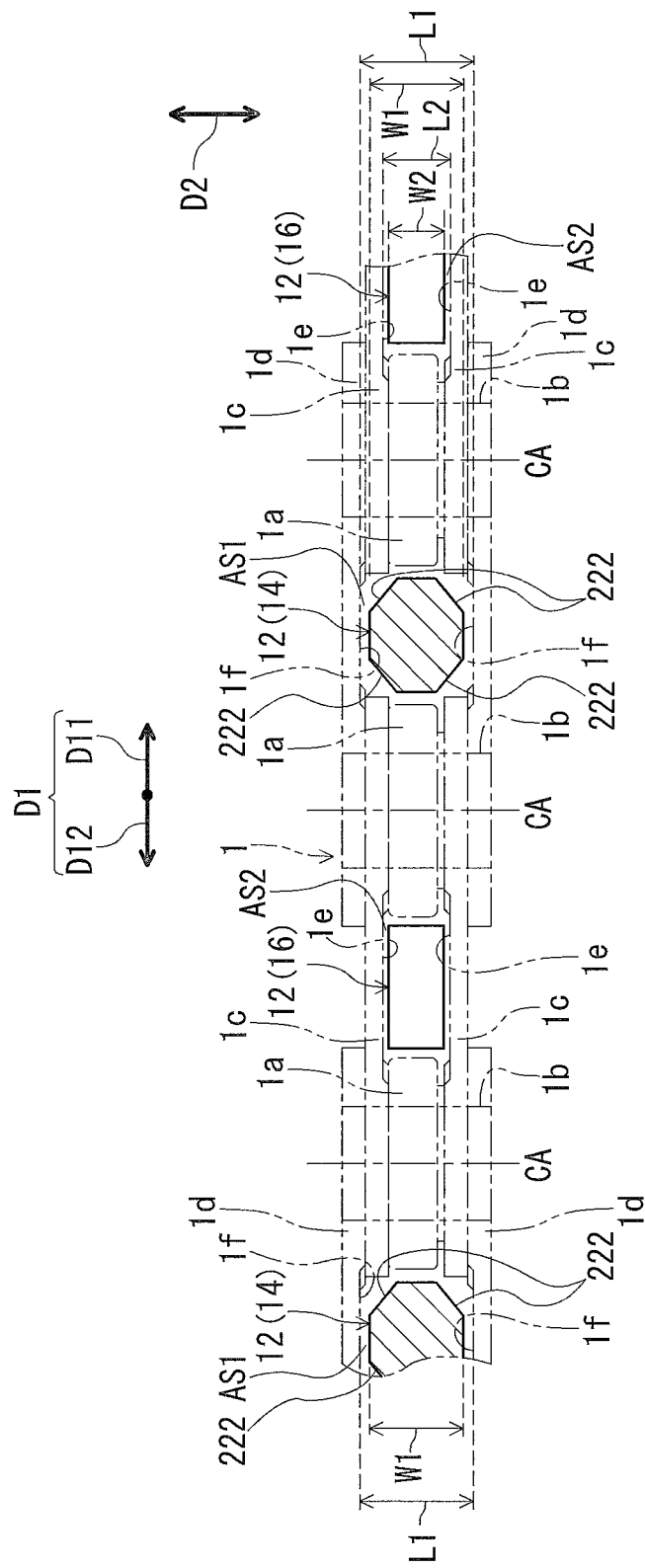
FIG. 9 is a cross-sectional view of the bicycle sprocket illustrated in FIG. 8.

As seen in FIGS. 8 and 9, the at least one first tooth 14 includes a chamfered part configured to reduce interference between the at least one first tooth 14 and one of inner ink plates of the bicycle chain 1. In the illustrated embodiment, the first tooth 14 includes chamfered parts 222 configured to reduce interference between one of the inner link plates 1c (FIG. 9) of the bicycle chain 1 and the first tooth 14 in a state where the first tooth 14 engages with the bicycle chain 1. More specifically, each of the sprocket teeth 12 includes chamfered parts 222 configured to reduce interference between each of the sprocket teeth 12 and one of the inner link plates 1c (FIG. 9) of the bicycle chain 1 in a state where the sprocket teeth 12 engage with the bicycle chain 1.

As seen in FIG. 8, the chamfered part 222 of the first tooth 14 is adjacent to the tooth bottom 12a of the first tooth 14. In the illustrated embodiment, the chamfered part 222 of the first tooth 14 is adjacent to a first tooth bottom 14a of the first tooth 14. The chamfered part 222 of the first tooth 14 preferably extends from the first tooth bottom 14a to an end of the first tooth 14.

With the bicycle sprocket 210, the chamfered part 222 can reduce wear of the first tooth 14 in addition to the advantageous effect obtained by the bicycle sprocket 10 in accordance with the first embodiment.

Third Embodiment

A bicycle sprocket 310 in accordance with a third embodiment will be described below referring to FIGS. 10 to 12. The bicycle sprocket 310 has the same configuration as the bicycle sprocket 10 except for sprocket teeth 12. Thus, elements having substantially the same function as those in the first embodiment will be numbered the same here, and will not be described again in detail here for the sake of brevity.

Figure 10:
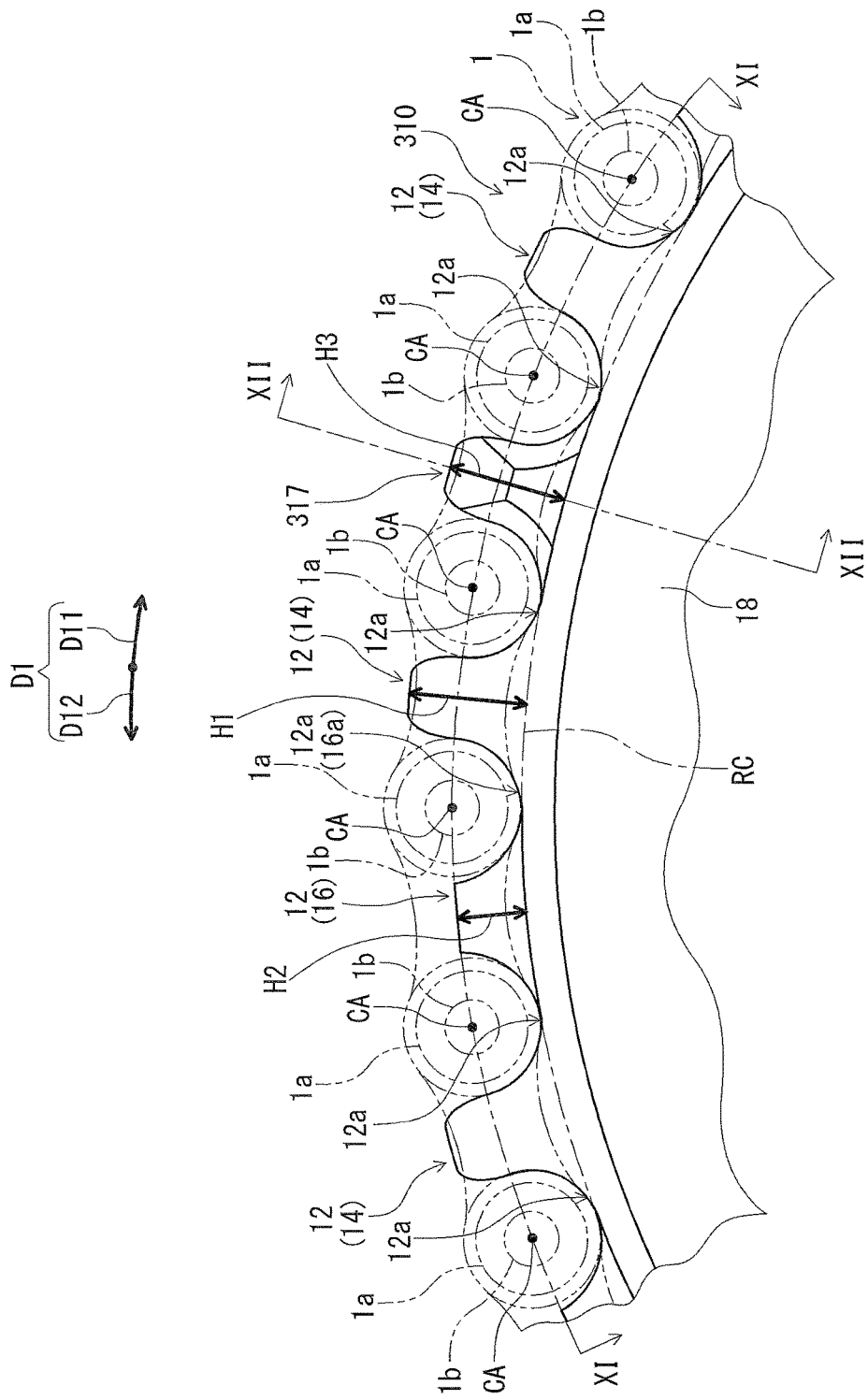
FIG. 10 is an enlarged elevational view of a bicycle sprocket in accordance with a third embodiment.
Figure 11:
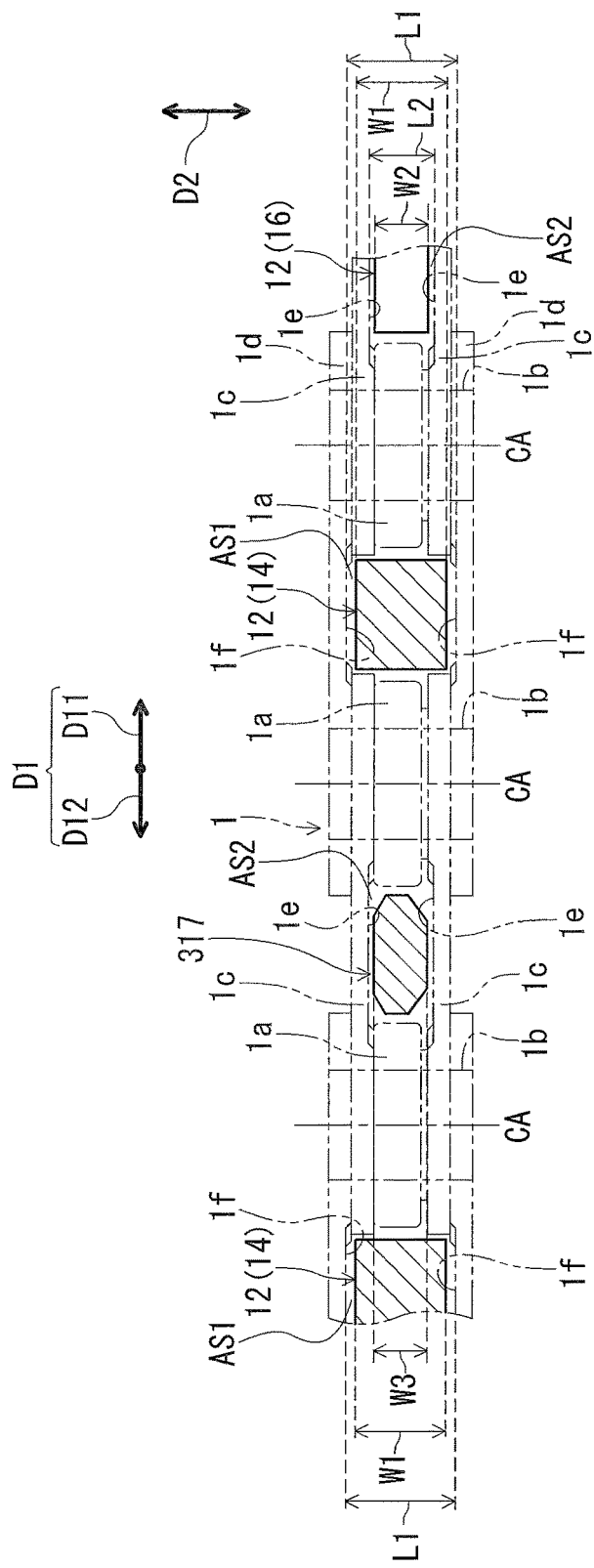
FIG. 11 is a cross-sectional view of the bicycle sprocket taken along line XI-XI of FIG. 10.
Figure 12:
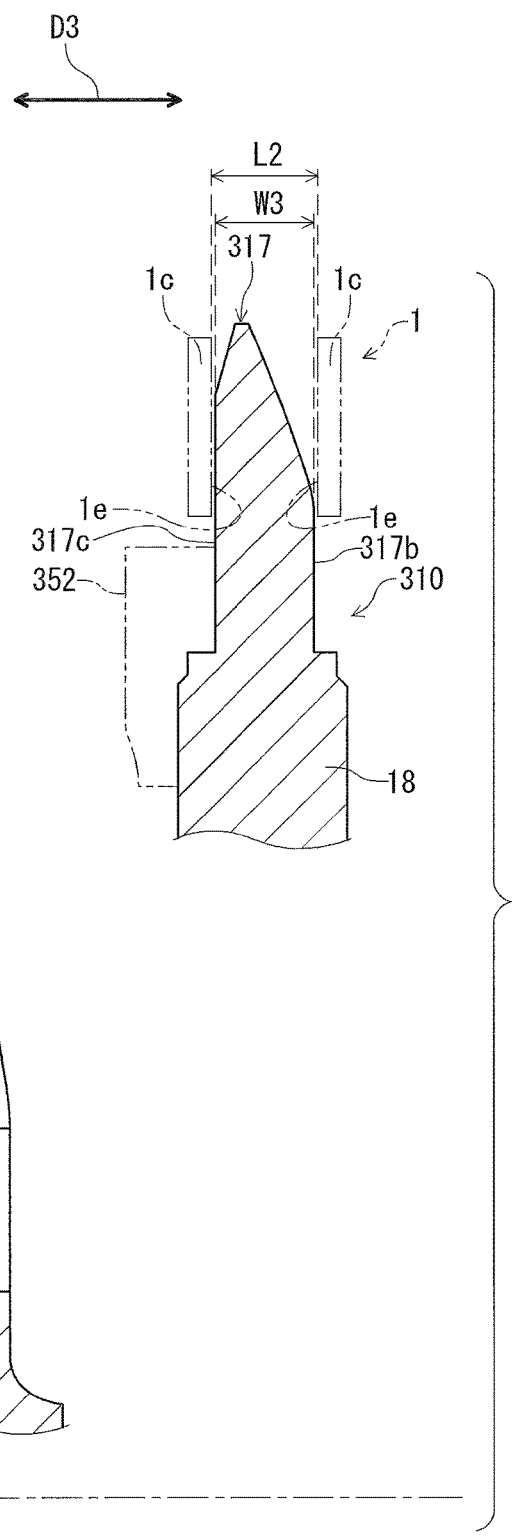
FIG. 12 is a cross-sectional view of the bicycle sprocket taken along line XII-XII of FIG. 10.

As seen in FIGS. 10 to 12, the bicycle sprocket 10 further comprises at least one additional tooth having a chain-engaging axial width smaller than the second distance L2 defined between opposed inner link plates 1c of the bicycle chain 1. Each of the at least one additional tooth is disposed adjacent to the at least one first tooth 14 such that the bicycle chain 1 is shifted between the bicycle sprocket 10 and an additional bicycle sprocket in an area in which the at least one additional tooth is positioned.

In the illustrated embodiment, the bicycle sprocket 310 further comprises an additional tooth 317. The additional tooth 317 is disposed between adjacent two of the first teeth 14 such that the bicycle chain 1 is shifted between the bicycle sprocket 10 and an additional bicycle sprocket 350 (FIG. 12) in an area in which the additional tooth 317 is positioned. The additional bicycle sprocket 350 is rotatable integrally with the bicycle sprocket 310. The structures of the bicycle sprocket 310 can be applied to the additional bicycle sprocket 350 if needed and/or desired.

As seen in FIG. 10, the additional tooth 317 has a third radial-tooth height H3. The third radial-tooth height H3 is larger than the second radial-tooth height H2 of the second tooth 16. The third radial-tooth height H3 is substantially equal to the first radial-tooth height H1 of the first tooth 14.

As seen in FIG. 11, the additional tooth 317 has a chain-engaging axial width W3 which is smaller than the second distance L2. The chain-engaging axial width W3 is smaller than the first chain-engaging axial width W1 of the first tooth 14. The chain-engaging axial width W3 is substantially equal to the second chain-engaging axial width W2 of the second tooth 16.

As seen in FIG. 12, the additional tooth 317 has a first chain-engaging surface 317b and a second chain-engaging surface 317c. The first chain-engaging surface 317b and the second chain-engaging surface 317c face in the axial direction D3. The first chain-engaging surface 317b and the second chain-engaging surface 317c are contactable with the opposed inner surfaces 1e of the inner link plates 1c, respectively. For example, the chain-engaging axial width W3 is a maximum axial width defined between the first chain-engaging surface 317b and the second chain-engaging surface 317c in the axial direction D3 parallel to the rotational axis A of the bicycle sprocket 310.

As seen in FIG. 12, the bicycle sprocket 310 may further comprise a spike pin 352 configured to guide the bicycle chain 1 toward the sprocket teeth 12 (FIG. 10) during shifting operation. The bicycle sprocket 310 can include a plurality of spike pins as the spike pin 352. The spike pin 352 is made of a metallic material and is a separate member from the sprocket teeth 12 and the sprocket body 18. The spike pin 352 can, however, be integrally provided with the sprocket teeth 12 and the sprocket body 18.

As described above, the bicycle sprocket 10 in accordance with the first embodiment can be applied to a bicycle sprocket assembly for shifting gears.

Fourth Embodiment

A bicycle sprocket 410 in accordance with a fourth embodiment will be described below referring to FIG. 13. The bicycle sprocket 410 has the same configuration as the bicycle sprocket 10 except for the sprocket teeth 12. Thus, elements having substantially the same function as those in the first embodiment will be numbered the same here, and will not be described again in detail here for the sake of brevity.

Figure 13:
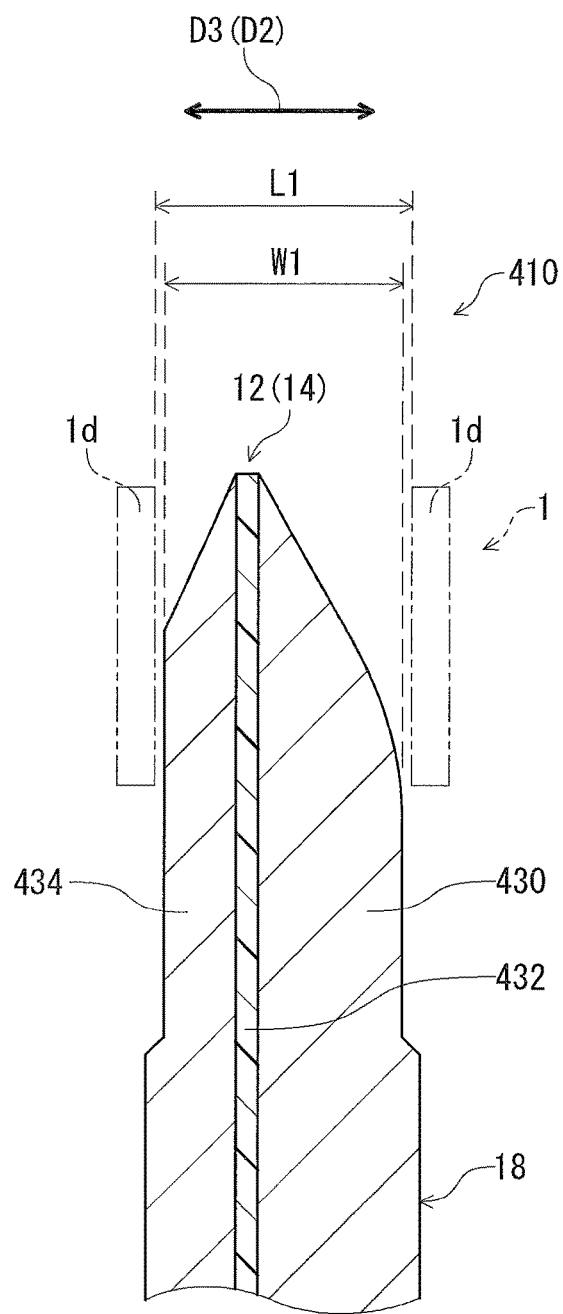
FIG. 13 is a cross-sectional view of a bicycle sprocket in accordance with a fourth embodiment.

As seen in FIG. 13, each of the sprocket teeth 12 has a multi-layered structure with different materials. Each of the sprocket teeth 12 includes a first sprocket layer 430, a second sprocket layer 432, and a third sprocket layer 434. For example, the first sprocket layer 430 is made of a first-layer material comprising iron. The second sprocket layer 432 can be made of a second-layer material comprising a resin material. The third sprocket layer 434 is made of a third-layer material comprising iron. The second sprocket layer 432 is provided between the first sprocket layer 430 and the third sprocket layer 434. For example, the first sprocket layer 430 and the third sprocket layer 434 are bonded to the second sprocket layer 432 by integral molding.

Materials of the multi-layered structure of the sprocket teeth 12 are not limited to the above embodiment. For example, the second sprocket layer 432 can be made of a second-layer material comprising aluminum. In such embodiment, the second sprocket layer 432 is bonded to the first sprocket layer 430 and the third sprocket layer 434 using diffusion bonding or bonding material such as adhesive.

With the bicycle sprocket 410, the multi-layered structure can save weight of the sprocket teeth 12 in addition to the advantageous effect obtained by the bicycle sprocket 10 in accordance with the first embodiment.

Fifth Embodiment

A bicycle sprocket 510 in accordance with a fifth embodiment will be described below referring to FIG. 14. The bicycle sprocket 510 has the same configuration as the bicycle sprocket 10 except for the sprocket teeth 12. Thus, elements having substantially the same function as those in the first embodiment will be numbered the same here, and will not be described again in detail here for the sake of brevity.

Figure 14:
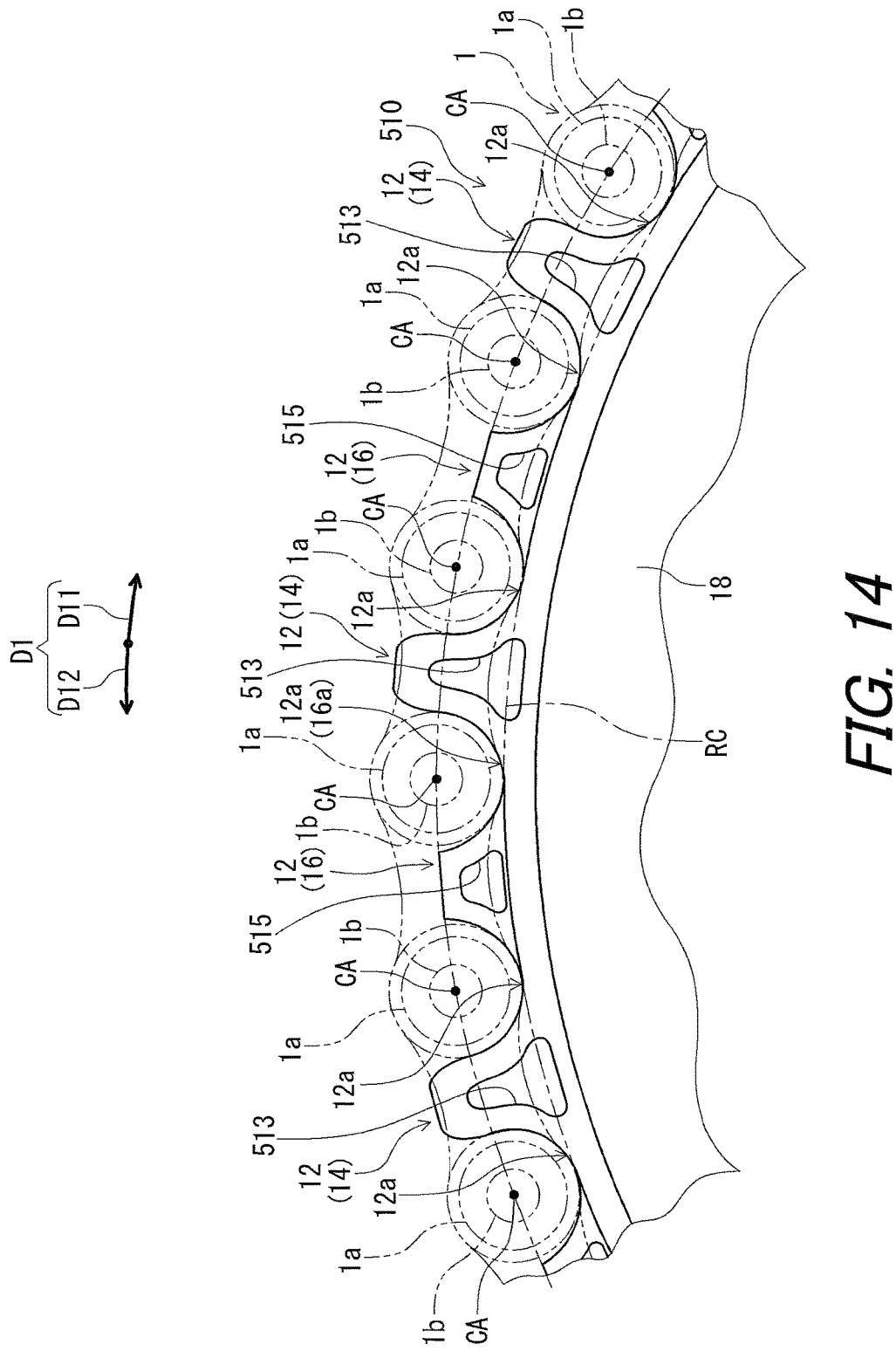
FIG. 14 is an enlarged elevational view of a bicycle sprocket in accordance with a fifth embodiment.

As seen in FIG. 14, each of the sprocket teeth 12 includes the tooth bottom 12a defining the root circle RC of the bicycle sprocket 510. At least one of the sprocket teeth 12 includes a closed opening at least partially provided radially outward of the root circle RC. In the illustrated embodiment, each of the first teeth 14 includes a closed opening 513 at least partially provided radially outward of the root circle RC. Each of the second teeth 16 includes a closed opening 515 entirely provided radially outward of the root circle RC. The closed opening such as the closed openings 513 and 515 can be provided in at least one of the sprocket teeth 12 if needed and/or desired. The closed opening 513 can be entirely provided radially outward of the root circle RC if needed and/or desired. Furthermore, the closed opening 515 can be at least partially provided radially outward of the root circle RC if needed and/or desired. One of the closed openings 513 and 515 can be omitted from the bicycle sprocket 510 if needed and/or desired.

With the bicycle sprocket 510, the closed openings 513 and 515 can save weight of the sprocket teeth 12 in addition to the advantageous effect obtained by the bicycle sprocket 10 in accordance with the first embodiment.

Sixth Embodiment

A bicycle sprocket 610 in accordance with a sixth embodiment will be described below referring to FIGS. 15 and 16. The bicycle sprocket 610 has the same configuration as the bicycle sprocket 10 except for the sprocket teeth 12. Thus, elements having substantially the same function as those in the first embodiment will be numbered the same here, and will not be described again in detail here for the sake of brevity.

Figure 15:
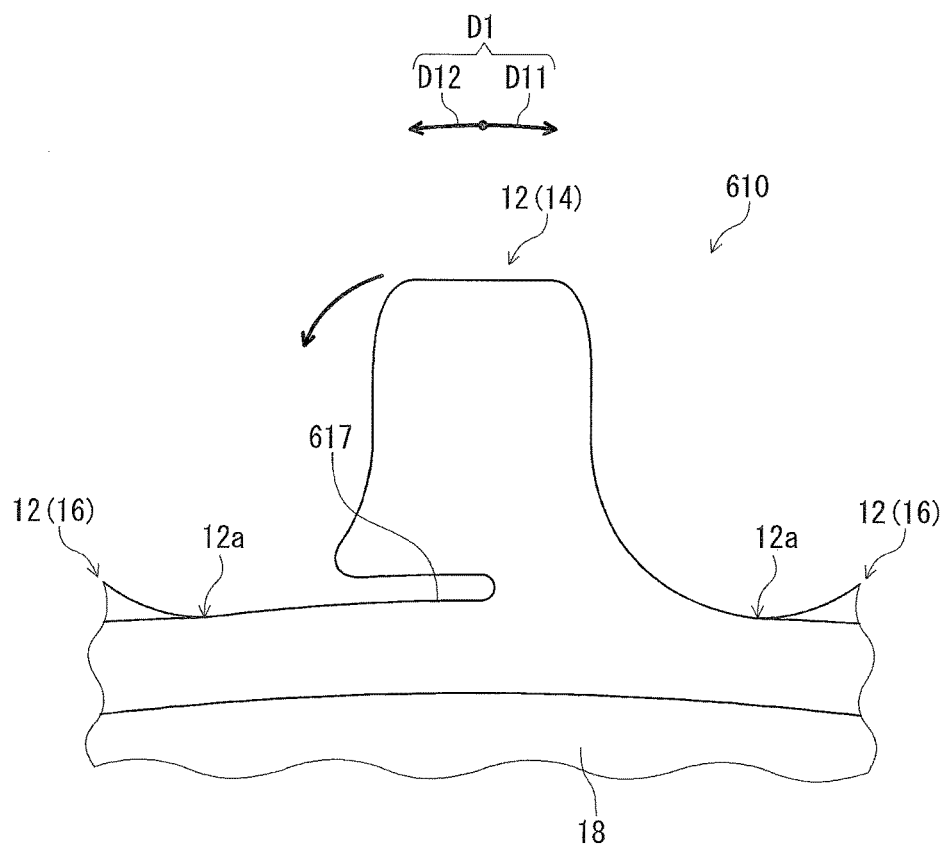
FIG. 15 is an enlarged elevational view of a bicycle sprocket in accordance with a sixth embodiment.
Figure 16:
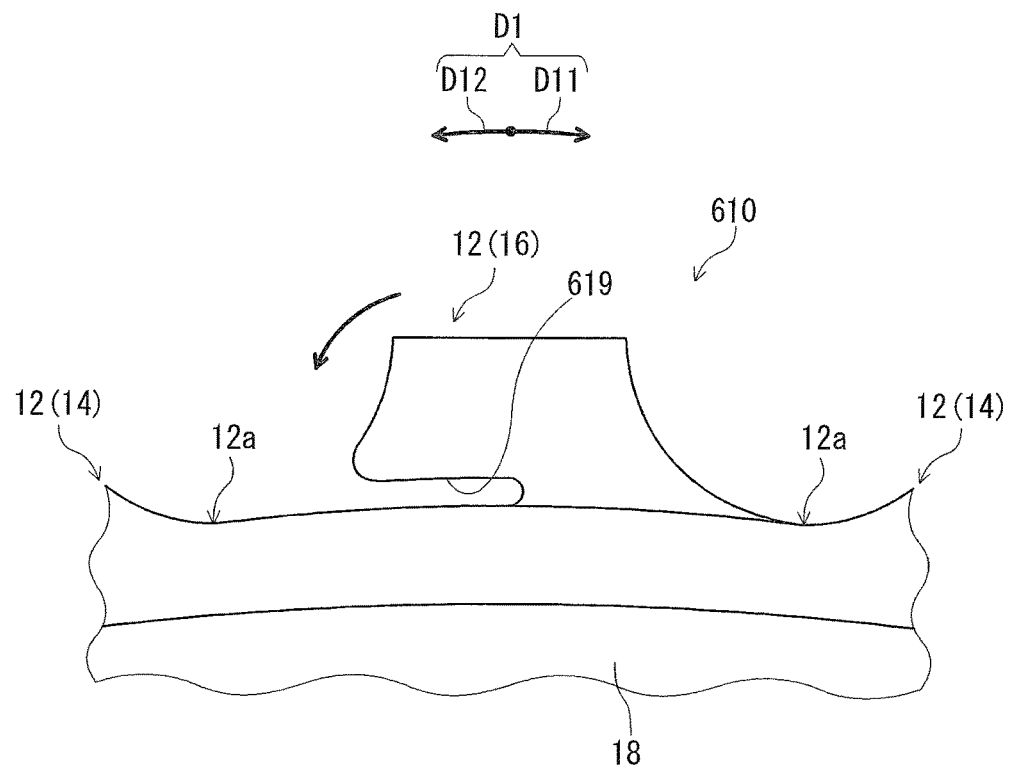
FIG. 16 is an enlarged elevational view of the bicycle sprocket in accordance with the sixth embodiment.

As seen in FIGS. 15 and 16, at least one of the sprocket teeth 12 includes a cutout configured to increase flexibility of the at least one of the sprocket teeth 12. In the illustrated embodiment, as seen in FIG. 15, each of the first teeth 14 includes a cutout 617 configured to increase flexibility of each of the first teeth 14. The cutout 617 extends in the circumferential direction D1. More specifically, the cutout 617 extends in the rotational driving direction D11 from one of the tooth bottoms 12a toward the other of the tooth bottoms 12a in the first tooth 14.

Similarly, as seen in FIG. 16, each of the second teeth 16 includes a cutout 619 configured to increase flexibility of each of the second teeth 16. The cutout 619 extends in the circumferential direction D1. More specifically, the cutout 619 extends in the rotational driving direction D11 from one of the tooth bottoms 12a toward the other of the tooth bottoms 12a in the second tooth 16. The cutout such as the cutouts 617 and 619 can be provided in at least one of the sprocket teeth 12 if needed and/or desired. The shapes of the cutouts 617 and 619 are not limited to the illustrated embodiment.

With the bicycle sprocket 610, the cutout 617 allows the first tooth 14 to absorb a shock caused by the first tooth 14 and the bicycle chain 1, and thereby it is possible to improve wear resistance of the first tooth 14, in addition to the advantageous effect obtained by the bicycle sprocket 10 in accordance with the first embodiment. Similarly, the cutout 619 allows the second tooth 16 to absorb a shock caused by the second tooth 16 and the bicycle chain 1, and thereby it is possible to improve wear resistance of the second tooth 16, in addition to the advantageous effect obtained by the bicycle sprocket 10 in accordance with the first embodiment.

Seventh Embodiment

A bicycle sprocket 710 in accordance with a seventh embodiment will be described below referring to FIG. 17. The bicycle sprocket 710 has the same configuration as the bicycle sprocket 10 except for the sprocket teeth 12 and the sprocket body 18. Thus, elements having substantially the same function as those in the first embodiment will be numbered the same here, and will not be described again in detail here for the sake of brevity.

Figure 17:
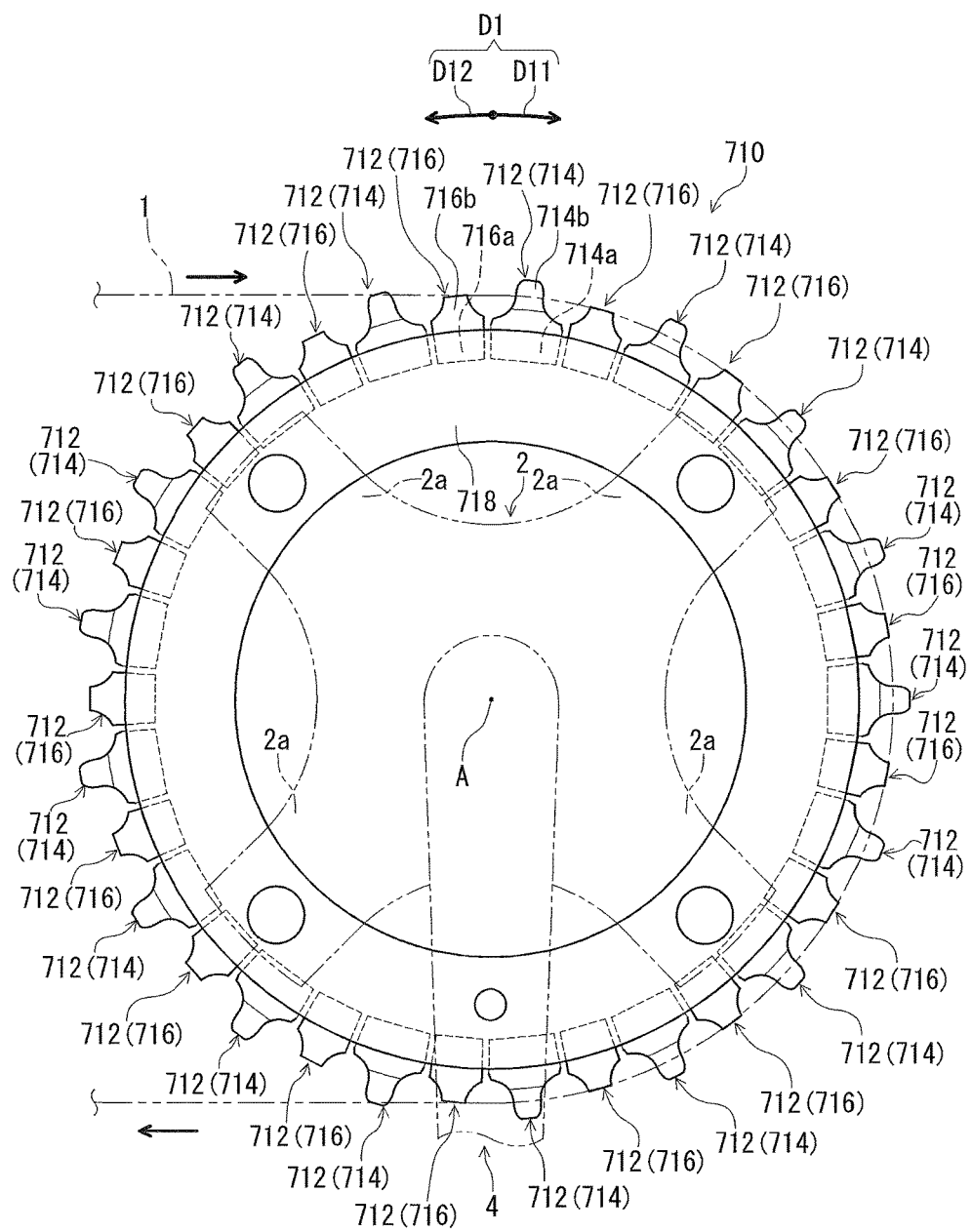
FIG. 17 is an elevational view of a bicycle sprocket in accordance with a seventh embodiment.

As seen in FIG. 17, the bicycle sprocket 710 comprises sprocket teeth 712. The sprocket teeth 712 include at least one first tooth 714 and at least one second tooth 716. In the illustrated embodiment, the sprocket teeth 712 include a plurality of first teeth 714 as the at least one first tooth 714 and a plurality of second teeth 716 as the at least one second tooth 716. The at least one first tooth 714 and the at least one second tooth 716 are alternately arranged in the circumferential direction D1 of the bicycle sprocket 10.

The bicycle sprocket 710 further comprises a sprocket body 718 having an annular shape. The sprocket teeth 712 are separate members from each other and are spaced apart from each other in the circumferential direction D1 of the bicycle sprocket 710. The sprocket body 718 is configured to be fastened to the crank connecting arms 2a of the sprocket mounting member 2 by bolts (not shown).

Each of the sprocket teeth 712 includes a base part and a tooth part. In the illustrated embodiment, the first tooth 714 includes a base part 714a and a tooth part 714b. The base part 714a is implanted in the sprocket body 718. The tooth part 714b radially outwardly protrudes from the base part 714a. Similarly, the second tooth 716 includes a base part 716a and a tooth part 716b. The base part 716a is implanted in the sprocket body 718. The tooth part 716b radially outwardly protrudes from the base part 716a.

Each of the sprocket teeth 712 is made of a first material comprising a metallic material e.g. which can be selected from a group comprising aluminum, titanium or iron. The sprocket body 718 is made of a second material which is lighter than the first material. For example, such a second material can be selected from a group comprising aluminum, titanium and a resin material. The first teeth 714 and the second teeth 716 are at least partially embedded in the sprocket body 718 by integral molding such as insertion molding.

With the bicycle sprocket 710, since the sprocket body 718 is made of the second material comprising a resin material, it is possible to save weight of the bicycle sprocket 710 in addition to the advantageous effect obtained by the bicycle sprocket 10 in accordance with the first embodiment.

Eighth Embodiment

A bicycle sprocket 810 in accordance with an eighth embodiment will be described below referring to FIGS. 18 to 20. The bicycle sprocket 810 has the same configuration as the bicycle sprocket 10 except for the sprocket teeth 12. Thus, elements having substantially the same function as those in the first embodiment will be numbered the same here, and will not be described again in detail here for the sake of brevity.

Figure 18:
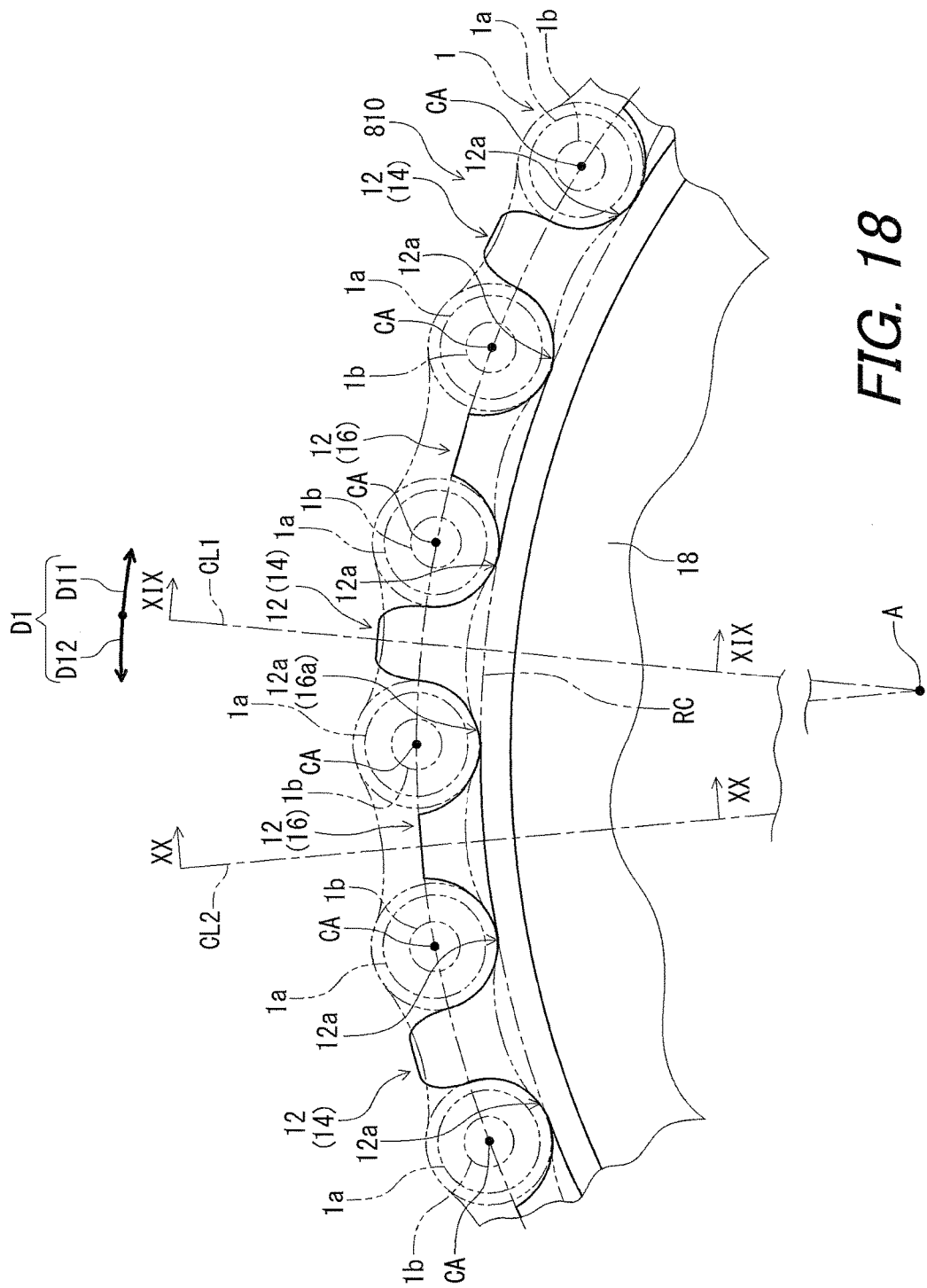
FIG. 18 is an enlarged elevational view of a bicycle sprocket in accordance with an eighth embodiment.

As seen in FIG. 18, the sprocket teeth 12 are equally spaced apart from each other in the circumferential direction D1 of the bicycle sprocket 810. Each of the sprocket teeth 12 has a center line radially extending from the rotational axis A of the bicycle sprocket 810. Each of the sprocket teeth 12 has a symmetrical shape with respect to the center line.

In the illustrated embodiment, each of the first teeth 14 has a center line CL1 radially extending from the rotational axis A of the bicycle sprocket 810. Each of the first teeth 14 has a symmetrical shape with respect to the center line CL1. More specifically, each of the first teeth 14 has a symmetrical shape with respect to the center line CL1 when viewed from a direction of the rotational axis A.

Figure 19:
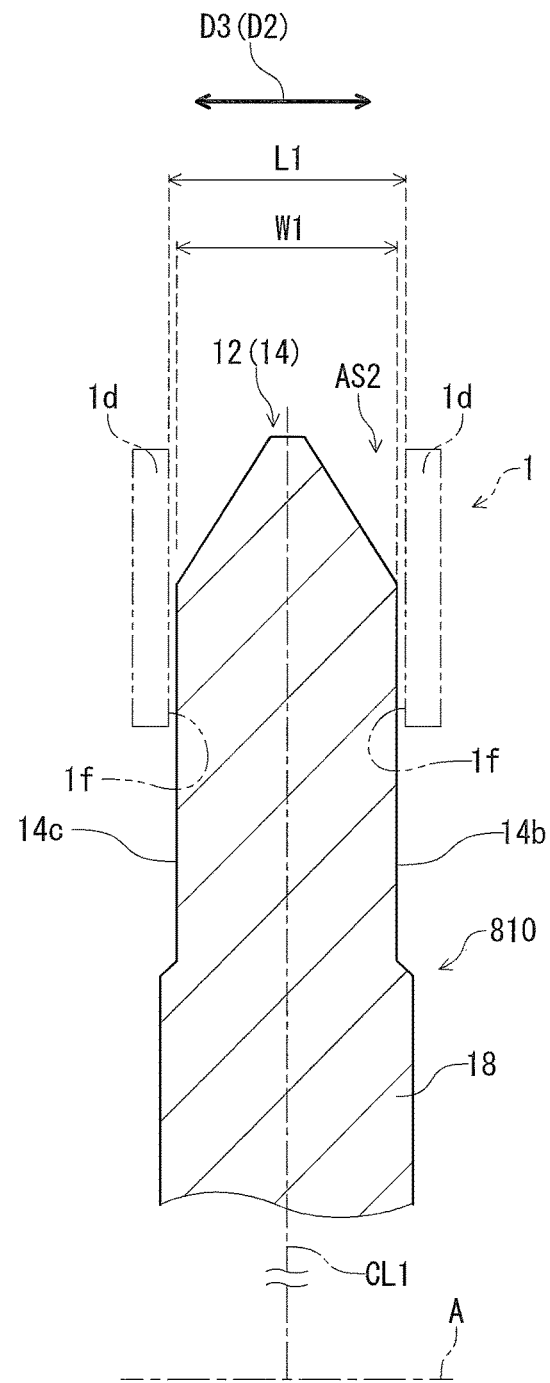
FIG. 19 is a cross-sectional view of the bicycle sprocket taken along line XIX-XIX of FIG. 18.

As seen in FIG. 19, the center line CL1 is perpendicular to the rotational axis A. Each of the first teeth 14 has a symmetrical shape with respect to the center line CL1 when viewed from the circumferential direction D1 of the bicycle sprocket 810.

Similarly, as seen in FIG. 18, each of the second tooth 16 has a center line CL2 radially extending from the rotational axis A of the bicycle sprocket 810. Each of the second teeth 16 has a symmetrical shape with respect to the center line CL2. More specifically, each of the second teeth 16 has a symmetrical shape with respect to the center line CL2 when viewed from the direction of the rotational axis A.

Figure 20:
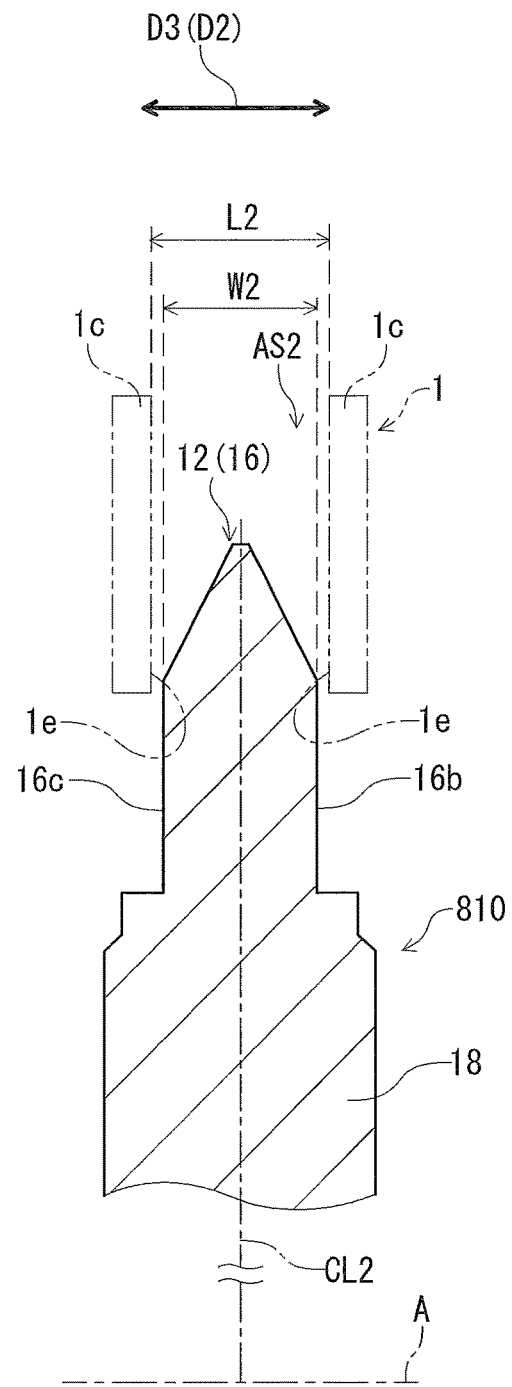
FIG. 20 is a cross-sectional view of the bicycle sprocket taken along line XX-XX of FIG. 18.

As seen in FIG. 20, the center line CL2 is perpendicular to the rotational axis A. Each of the second teeth 16 has a symmetrical shape with respect to the center line CL2 when viewed from the circumferential direction D1 of the bicycle sprocket 810.

With the bicycle sprocket 810, since each of the sprocket teeth 12 has a symmetrical shape with respect to the center line CL1 or CL2, both circumferential sides of the sprocket tooth 12 can be used as a driving side configured to face in the rotational driving direction D11. This allows the bicycle sprocket 810 to be used as a both-side usable sprocket in addition to the advantageous effect obtained by the bicycle sprocket 10 in accordance with the first embodiment.

Ninth Embodiment

A bicycle sprocket 910 in accordance with a ninth embodiment will be described below referring to FIGS. 21 to 23. The bicycle sprocket 910 has the same configuration as the bicycle sprocket 10 except for the sprocket teeth 12. Thus, elements having substantially the same function as those in the first embodiment will be numbered the same here, and will not be described again in detail here for the sake of brevity.

Figure 21:
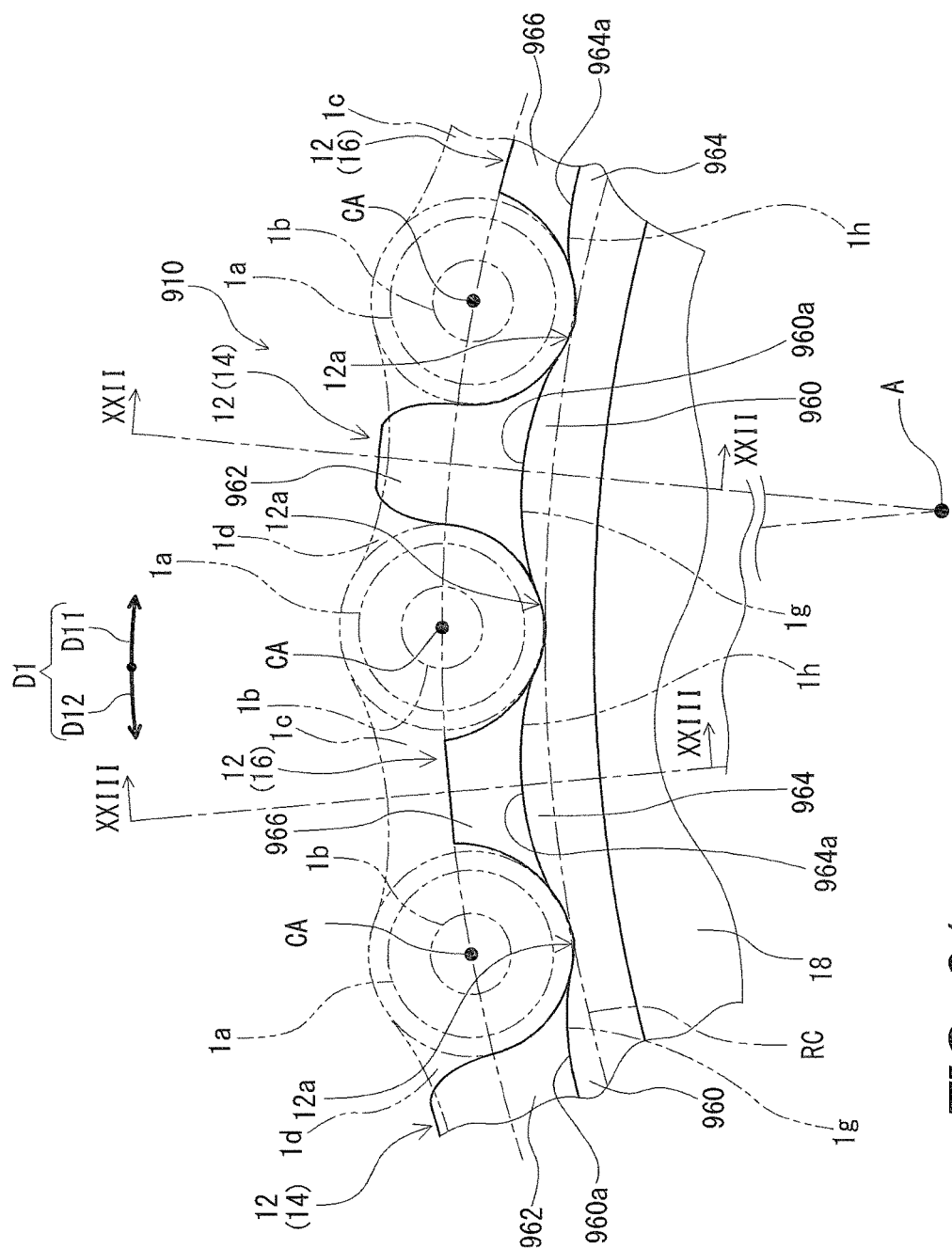
FIG. 21 is an enlarged elevational view of a bicycle sprocket in accordance with a ninth embodiment.
Figure 22:
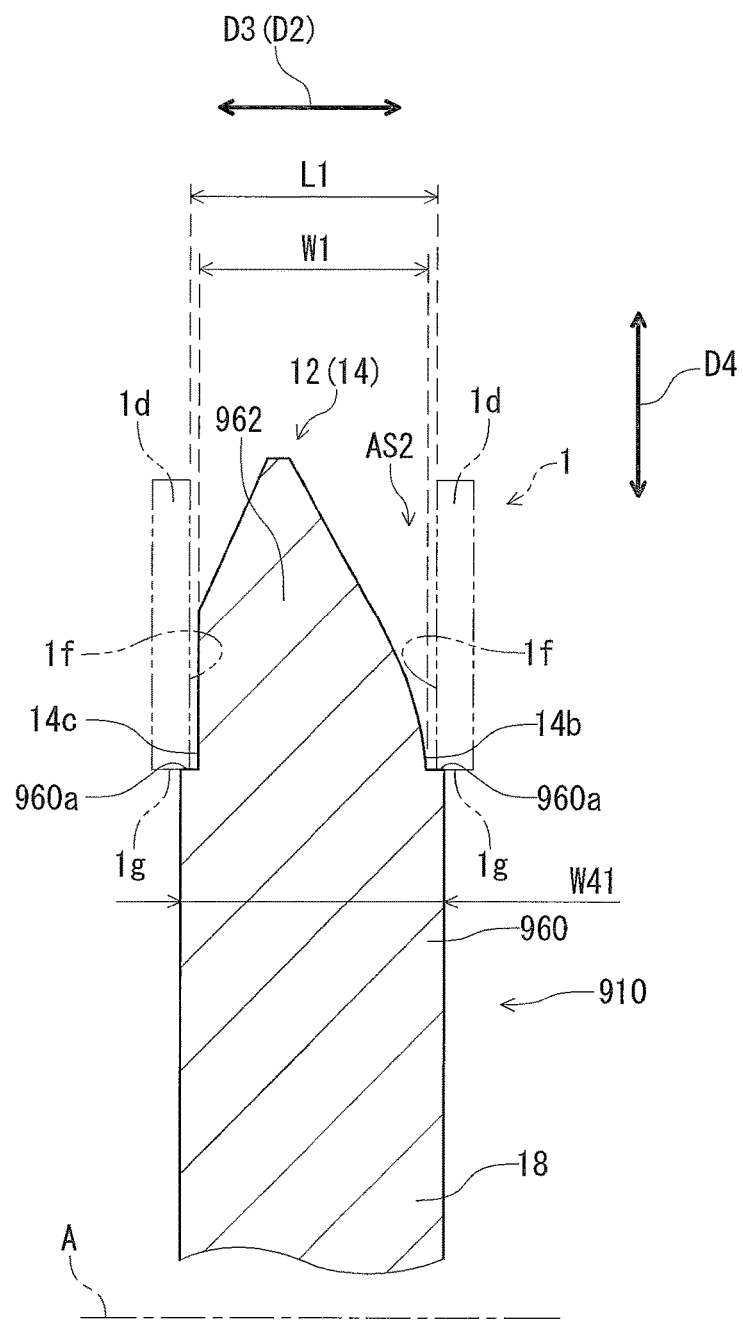
FIG. 22 is a cross-sectional view of the bicycle sprocket taken along line XXII-XXII of FIG. 21.

As seen in FIGS. 21 and 22, in the bicycle sprocket 910, the at least one first tooth 14 includes a first radial contact part 960 configured to contact at least one of intermediate portions 1g of outer link plates 1d of the bicycle chain 1 in a radial direction D4 (FIG. 22) of the bicycle sprocket 910 in a state where the at least one first tooth 14 engages with the outer link plates 1d of the bicycle chain 1. The first tooth 14 includes a first tooth body 962 radially outwardly protruding from the first radial contact part 960. The first radial contact part 960 is closer to the tooth bottoms 12a than the first tooth body 962. A radially outer surface 960a of the first radial contact part 960 has a shape complementary with an outer shape of the intermediate portion 1g of the outer link plate 1d. More specifically, the radially outer surface 960a of the first radial contact part 960 has a curved shape and is provided along an edge of the intermediate portion 1g of the outer link plate 1d.

As seen in FIG. 22, the first tooth body 962 has the first chain-engaging axial width W1. The first tooth body 962 includes the first chain-engaging surface 14b and the second chain-engaging surface 14c. The first radial contact part 960 has a first axial width W41 larger than the first distance L1 defined between opposed outer link plates 1d of the bicycle chain 1. The first axial width W41 is larger than the first chain-engaging axial width W1.

As seen in FIG. 22, the first radial contact part 960 protrudes from the first chain-engaging surface 14b and the second chain-engaging surface 14c in the axial direction D3. The first radial contact part 960 can, however, protrude from at least one of the first chain-engaging surface 14b and the second chain-engaging surface 14c.

Figure 23:
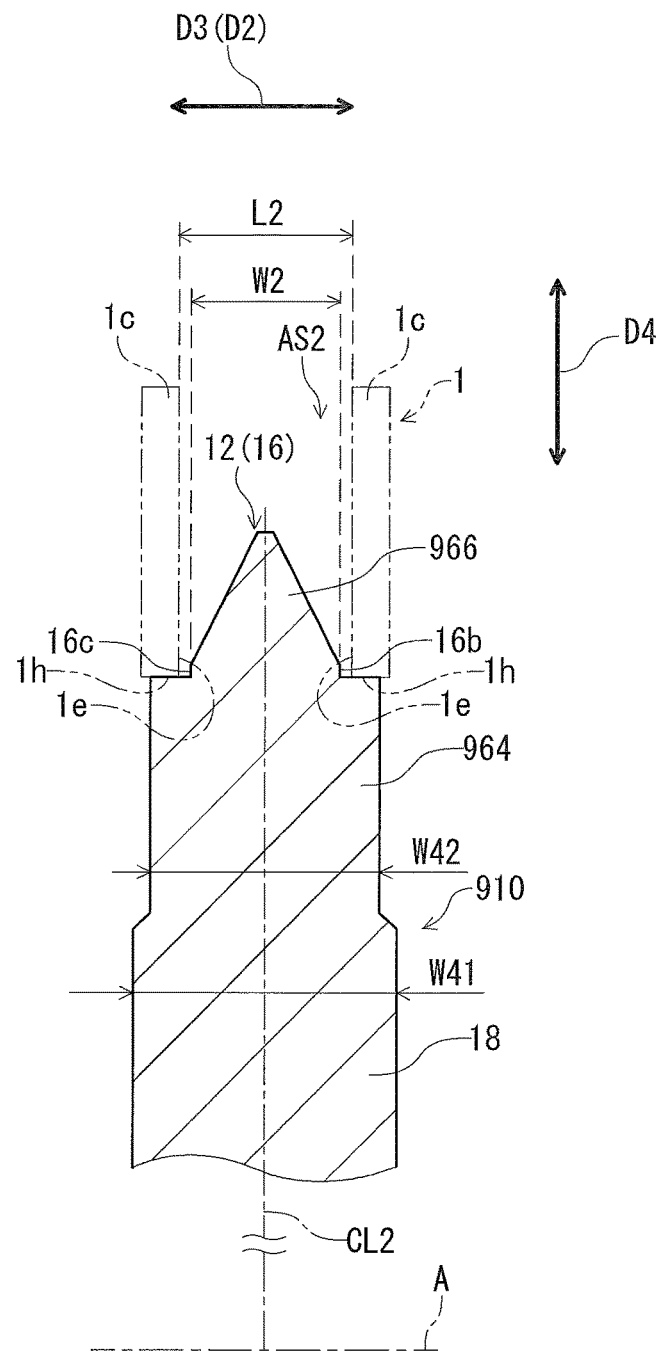
FIG. 23 is a cross-sectional view of the bicycle sprocket taken along line XXIII-XXIII of FIG. 21.

As seen in FIGS. 21 and 23, the at least one second tooth 16 includes a second radial contact part 964 configured to contact at least one of intermediate portions 1h of inner link plates 1c of the bicycle chain 1 in the radial direction D4 (FIG. 23) of the bicycle sprocket 10 in a state where the at least one second tooth 16 engages with the inner link plates 1c of the bicycle chain 1. The second tooth 16 includes a second tooth body 966 radially outwardly protruding from the second radial contact part 964. The second radial contact part 964 is closer to the tooth bottoms 12a than the second tooth body 966. A radially outer surface 964a of the second radial contact part 964 has a shape complementary with an outer shape of the intermediate portion 1h of the inner link plate 1c. More specifically, the radially outer surface 964a of the second radial contact part 964 has a curved shape and is provided along an edge of the intermediate portion 1h of the inner link plate 1c.

As seen in FIG. 23, the second tooth body 966 has the second chain-engaging axial width W2. The second tooth body 966 includes the third chain-engaging surface 16b and the fourth chain-engaging surface 16c. The second radial contact part 964 has a second axial width W42 larger than the second distance L2 defined between opposed inner link plates 1c of the bicycle chain 1. The second axial width W42 is larger than the second chain-engaging axial width W2.

As seen in FIG. 23, the second radial contact part 964 protrudes from the third chain-engaging surface 16b and the fourth chain-engaging surface 16c in the axial direction D3. The second radial contact part 964 can, however, protrude from at least one of the third chain-engaging surface 16b and the fourth chain-engaging surface 16c.

With the bicycle sprocket 910, the first radial contact part 960 is configured to contact the intermediate portions 1g of the outer link plates 1d of the bicycle chain 1 in the radial direction D4. Accordingly, the first radial contact part 960 can improve stability of the outer link plates 1d engaging with the first tooth 14 in addition to the advantageous effect obtained by the bicycle sprocket 10 in accordance with the first embodiment.

Similarly, the second radial contact part 964 is configured to contact the intermediate portions 1h of the inner link plates 1c of the bicycle chain 1 in the radial direction D4. Accordingly, the second radial contact part 964 can improve stability of the inner link plates 1c engaging with the second tooth 16 in addition to the advantageous effect obtained by the bicycle sprocket 10 in accordance with the first embodiment.

Tenth Embodiment

A bicycle sprocket 1010 in accordance with a tenth embodiment will be described below referring to FIG. 24. The bicycle sprocket 1010 has the same configuration as the bicycle sprocket 10 except for the sprocket body 18. Thus, elements having substantially the same function as those in the first embodiment will be numbered the same here, and will not be described again in detail here for the sake of brevity.

Figure 24:
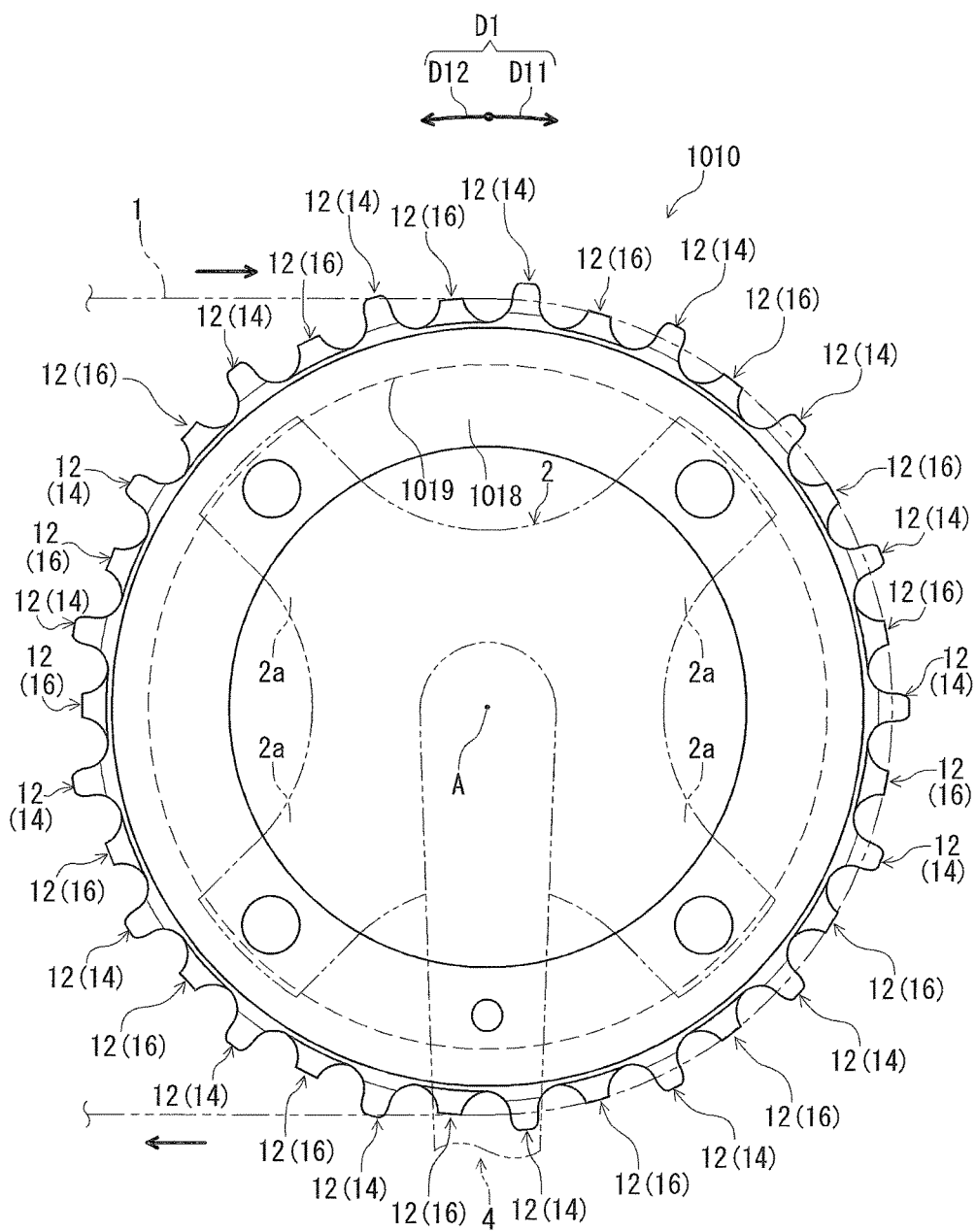
FIG. 24 is an elevational view of a bicycle sprocket in accordance with a tenth embodiment.

As seen in FIG. 24, the bicycle sprocket 1010 comprises the sprocket teeth 12. The bicycle sprocket 1010 further comprises a sprocket body 1018 having an annular shape. Each of the sprocket teeth 12 is made of a first material comprising a metallic material. The sprocket body 1018 is made of a second material comprising a resin material. The bicycle sprocket 1010 further comprises a ring portion 1019 having an annular shape. The sprocket teeth 12 protrude radially outward from the ring portion 1019. For example, the ring portion 1019 is made of the first material. The sprocket teeth 12 are integrally provided with the ring portion 1019 as a single unitary member. The ring portion 1019 is at least partially embedded in the sprocket body 1018. For example, the ring portion 1019 is embedded in the sprocket body 1018 by integral molding such as insertion molding. The sprocket body 1018 is configured to be fastened to the crank connecting arms 2a of the sprocket mounting member 2 by bolts (not shown).

With the bicycle sprocket 1010, it is possible to save weight of the bicycle sprocket 1010 in addition to the advantageous effect obtained by the bicycle sprocket 10 in accordance with the first embodiment.

Eleventh Embodiment

A bicycle sprocket 1110 in accordance with an eleventh embodiment will be described below referring to FIG. 25. The bicycle sprocket 1110 has the same configuration as the bicycle sprocket 10 except for the second teeth 16. Thus, elements having substantially the same function as those in the first embodiment will be numbered the same here, and will not be described again in detail here for the sake of brevity.

Figure 25:
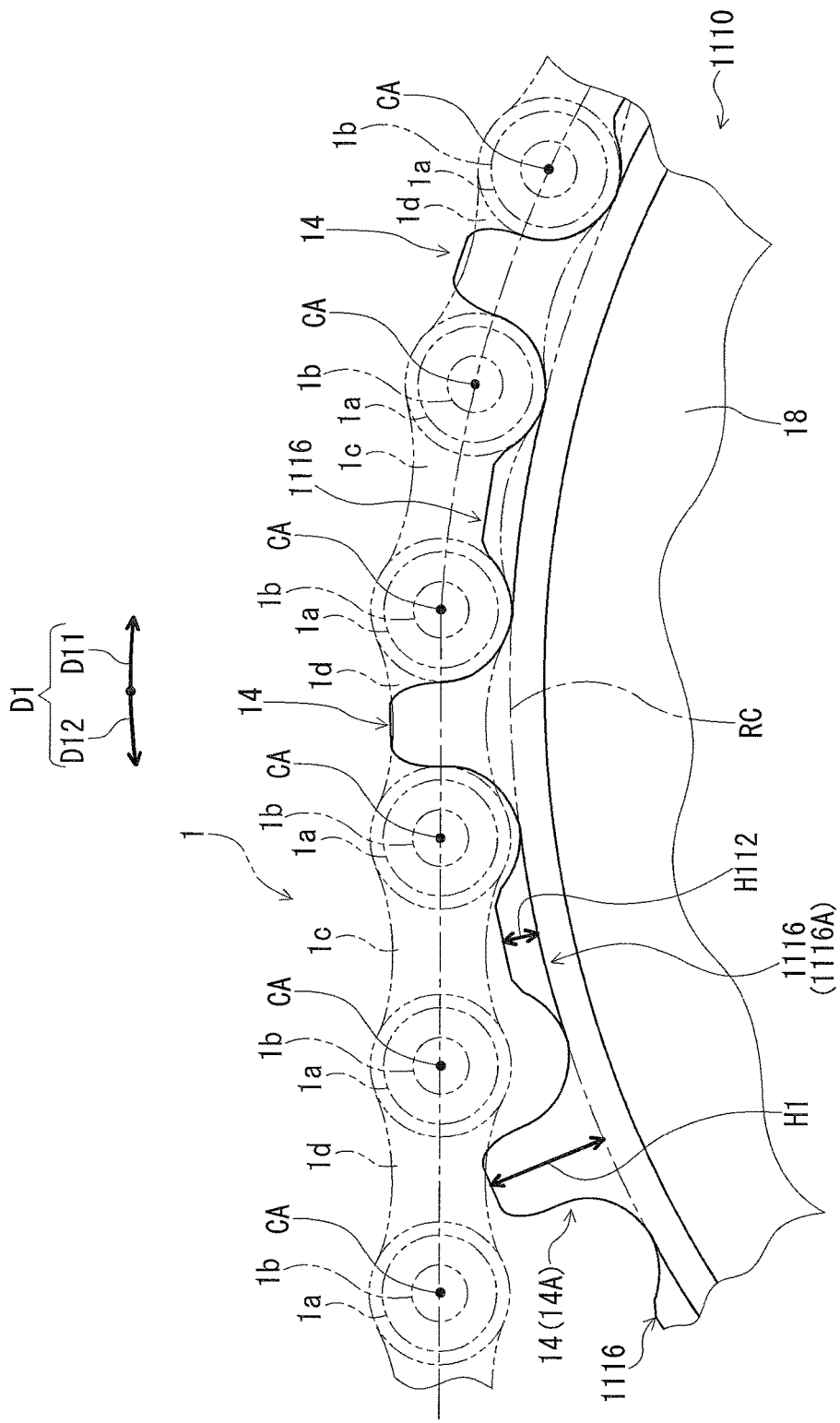
FIG. 25 is an enlarged elevational view of a bicycle sprocket in accordance with an eleventh embodiment for explaining positional relationship between the bicycle sprocket and a bicycle chain.

As seen in FIG. 25, the sprocket teeth 12 of the bicycle sprocket 1110 includes the at least one first tooth 14 and at least one second tooth 1116. In the illustrated embodiment, the sprocket teeth 12 include the plurality of first teeth 14 as the at least one first tooth 14 and plurality of second teeth 1116 as the at least one second tooth 1116. The first teeth 14 and the second teeth 1116 are alternately arranged in the circumferential direction D1.

The at least one second tooth 1116 is adjacent to the first tooth 14 and disposed on a downstream side in the rotational driving direction D11 of the bicycle sprocket 1110. In the illustrated embodiment, the second tooth 1116A is adjacent to the first tooth 14A and disposed on a downstream side with respect to the first tooth 14A in the rotational driving direction D11 of the bicycle sprocket 1110.

The at least one second tooth 1116 is configured to engage with the inner link plates 1c of the bicycle chain 1. The at least one second tooth 1116 has a second radial-tooth height H112. The first radial-tooth height H1 is greater than the second radial-tooth height H112. In the illustrated embodiment, the second radial-tooth height H112 of the second teeth 1116 is less than the second radial-tooth height H2 of the second teeth 16 in accordance with the first embodiment.

As seen in FIG. 25, the at least one first tooth 14 is configured to engage with the bicycle chain 1 before the second tooth 1116 engages with the bicycle chain 1. For example, the first tooth 14A engages with the bicycle chain 1 (the outer link plates 1d) before the second tooth 1116A engages with the bicycle chain 1 (the inner link plates 1c) since the first radial-tooth height H1 of the first tooth 14A is greater than the second radial-tooth height H112 of the second tooth 1116A.

With the bicycle sprocket 1110, it is possible to obtain the same advantageous effect as that of the bicycle sprocket 10 in accordance with the first embodiment.

In the above embodiments, the term "attached" or "attaching", as used herein, encompasses configurations in which an element directly attached to another element by affixing the element is directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "fixed" and their derivatives except for the terms "bonded" and "bonding."

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also is applied to words of similar meaning, for example, the terms "have", "include" and their derivatives.

The terms "member", "section", "portion", "part" or "element" when used in the singular can have the dual meaning of a single part or a plurality of parts.

The ordinal numbers such as the terms "first" or "second" recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket comprising:
   sprocket teeth including
      at least one first tooth configured to engage with outer link plates of a bicycle chain and having a first radial-tooth height, the at least one first tooth having a first chain-engaging axial width which is smaller than a first distance defined between opposed outer link plates of the bicycle chain and which is larger than a second distance defined between opposed inner link plates of the bicycle chain, and
      at least one second tooth adjacent to the first tooth and disposed on a downstream side in a rotational driving direction of the bicycle sprocket, the at least one second tooth being configured to engage with inner link plates of the bicycle chain, the at least one second tooth having a second radial-tooth height, the first radial-tooth height being greater than the second radial-tooth height; and a sprocket body having an annular shape, wherein each of the sprocket teeth includes a tooth bottom defining a root circle of the bicycle sprocket, the at least one second tooth has a radially outermost end, the second radial-tooth height is defined between the root circle and the radially outermost end, the at least one second tooth is configured to extend between the inner link plates of the bicycle chain when the at least one second tooth is fully engaged with inner link plates of the bicycle chain, the at least one first tooth and the at least one second tooth are alternatively arranged on a whole circumference of the sprocket body in a circumferential direction, and the at least one second tooth has a leading edge having a concave curved surface portion that extends directly from the radially outermost end.

2. The bicycle sprocket according to claim 1, wherein the sprocket teeth includes
a plurality of first teeth as the at least one first tooth, and
a plurality of second teeth as the at least one second tooth.

3. The bicycle sprocket according to claim 1, wherein the at least one first tooth is configured to engage with the bicycle chain before the second tooth engages with the bicycle chain.

4. The bicycle sprocket according to claim 1, wherein the at least one second tooth has a second chain-engaging axial width which is smaller than the second distance.

5. The bicycle sprocket according to claim 1, wherein the at least one first tooth includes a chamfered part configured to reduce interference between the at least one first tooth and one of inner ink plates of the bicycle chain.

6. The bicycle sprocket according to claim 1, wherein the at least one first tooth includes a first radial contact part configured to contact at least one of intermediate portions of outer link plates of the bicycle chain in a radial direction of the bicycle sprocket in a state where the at least one first tooth engages with the outer link plates of the bicycle chain.

7. The bicycle sprocket according to claim 6, wherein the first radial contact part has a first axial width larger than the first distance defined between opposed outer link plates of the bicycle chain.

8. The bicycle sprocket according to claim 1, wherein the at least one second tooth includes a second radial contact part configured to contact at least one of intermediate portions of inner link plates of the bicycle chain in a radial direction of the bicycle sprocket in a state where the at least one second tooth engages with the inner link plates of the bicycle chain.

9. The bicycle sprocket according to claim 8, wherein the second radial contact part has a second axial width larger than the second distance defined between opposed inner link plates of the bicycle chain.

10. The bicycle sprocket according to claim 1, further comprising:

a spike pin configured to guide the bicycle chain toward the sprocket teeth during shifting operation.

11. The bicycle sprocket according to claim 1, wherein each of the sprocket teeth has a multi-layered structure with different materials.

12. The bicycle sprocket according to claim 11, wherein each of the sprocket teeth includes
a first sprocket layer made of a first-layer material comprising iron,
a second sprocket layer made of a second-layer material comprising aluminum, and
a third sprocket layer made of a third-layer material comprising iron, the second sprocket layer being provided between the first sprocket layer and the third sprocket layer.

13. The bicycle sprocket according to claim 11, wherein each of the sprocket teeth includes
a first sprocket layer made of a first-layer material comprising iron,
a second sprocket layer made of a second-layer material comprising a resin material, and
a third sprocket layer made of a third-layer material comprising iron, the second sprocket layer being provided between the first sprocket layer and the third sprocket layer.

14. The bicycle sprocket according to claim 1, wherein at least one of the sprocket teeth includes a closed opening at least partially provided radially outward of the root circle.

15. The bicycle sprocket according to claim 1, wherein at least one of the sprocket teeth includes a cutout configured to increase flexibility of the at least one of the sprocket teeth.

16. The bicycle sprocket according to claim 1, wherein the sprocket teeth are separate members from each other and spaced apart from each other in the circumferential direction of the bicycle sprocket, and
each of the sprocket teeth includes
a base part implanted in the sprocket body, and
a tooth part radially outwardly protruding from the base part.

17. The bicycle sprocket according to claim 16, wherein each of the sprocket teeth is made of a first material comprising a metallic material, and
the sprocket body is made of a second material comprising a resin material.

18. The bicycle sprocket according to claim 1, wherein each of the sprocket teeth is made of a first material comprising a metallic material, and the sprocket body is made of a second material comprising a resin material.

19. The bicycle sprocket according to claim 1, wherein the sprocket teeth are equally spaced apart from each other in the circumferential direction of the bicycle sprocket,
each of the sprocket teeth has a center line radially extending from a rotational axis of the bicycle sprocket, and
each of the sprocket teeth has a symmetrical shape with respect to the center line.

* * * * *